United States Patent
Peterson

(10) Patent No.: US 8,847,964 B2
(45) Date of Patent: Sep. 30, 2014

(54) PHYSICAL SIMULATION TOOLS FOR TWO-DIMENSIONAL (2D) DRAWING ENVIRONMENTS

(75) Inventor: John Peterson, Menlo Park, CA (US)

(73) Assignee: Adobe Systems Incorporated, San Jose, CA (US)

( * ) Notice: Subject to any disclaimer, the term of this patent is extended or adjusted under 35 U.S.C. 154(b) by 660 days.

(21) Appl. No.: 13/034,469

(22) Filed: Feb. 24, 2011

(65) Prior Publication Data

US 2013/0127874 A1    May 23, 2013

(51) Int. Cl.
*G06T 13/00*    (2011.01)
*G06T 13/80*    (2011.01)

(52) U.S. Cl.
CPC ....................................... *G06T 13/80* (2013.01)
USPC ............................ 345/473; 345/419; 345/581

(58) Field of Classification Search
None
See application file for complete search history.

(56) References Cited

U.S. PATENT DOCUMENTS

| | | | |
|---|---|---|---|
| 6,911,980 B1 | 6/2005 | Newell et al. | |
| 7,385,612 B1 | 6/2008 | Peterson | |
| 7,511,703 B2 * | 3/2009 | Wilson et al. | 345/175 |
| 2003/0179203 A1 * | 9/2003 | Bruderlin et al. | 345/473 |
| 2009/0174703 A1 * | 7/2009 | Hermanson et al. | 345/419 |

OTHER PUBLICATIONS

Deusen, O., et al., "The Elements of Nature: Interactive and Realistic Techniques," ACM SIGGRAPH 2004 Course Note #31, Aug. 2004, 406 pages.

J. O'Brien and J. Hodgins. Graphical models and animation of brittle fracture. In Proceedings of SIGGRAPH'99, pp. 137-146, 1999, 10 pages.

O'Brien J. F., Bargteil A. W., Hodgins J. K.: Graphical modeling and animation of ductile fracture. In Proceedings of SIGGRAPH 2002 (2002), pp. 291-294.

Platt, J.C. and Barr, A.H., "Constraint methods for flexible models," Computer Graphics (Proc. SIGGRAPH), vol. 22, pp. 279-288, 1988.

Demetri Terzopoulos, Kurt Fleiseher, Modeling Inelastic Deformation: Viscoelasticity, Plasticity, Fracture. In Computer Graphics, vol. 22, No. 4, Aug. 1988, 10 pages.

Witkin, A., and Baraff, D. 1988. Large steps in cloth simulation. In Computer Graphics Proceedings, Annual Conference Series, ACM SIGGRAPH 98, 43-54, 12 pages.

Shi, L. and Yu, T., Controllable smoke animation with guiding objects, Journal ACM Transactions on Graphics (TDG), vol. 24 Issue 1, Jan. 2005, 25 pages.

(Continued)

*Primary Examiner* — Said Broome
(74) *Attorney, Agent, or Firm* — Wolfe-SBMC

(57) ABSTRACT

Methods and apparatus for simulating various physical effects on 2D objects in two-dimensional (2D) drawing environments. A set of 2D physical simulation tools may be provided for editing and enhancing 2D art based on 2D physical simulations. Each 2D physical simulation tool may be associated with a particular physical simulator that may be applied to 2D objects in an image using simple and intuitive gestures applied with the respective tool. In addition, predefined materials may be specified for a 2D object to which a 2D physical simulation tool may be applied. The 2D physical simulation tools may be used to simulate physical effects in static 2D images and to generate 2D animations of the physical effects. Computing technologies may be leveraged so that the physical simulations may be executed in real-time or near-real-time as the tools are applied, thus providing immediate feedback and realistic visual effects.

23 Claims, 13 Drawing Sheets

(56) References Cited

OTHER PUBLICATIONS

Havok™ AI: Efficient Pathfinding for Dynamic Game Environments, http://www.havok.com/uploads/, Havok_AI_Brief_Jun29.pdf, Jun. 2010, 2 pages.

Havok™ Animation: Scale and Perform!, http://www.havok.com/uploads/Havok_Animation_Brief_Mar%204.pdf, Mar. 2010, 2 pages.

Havok™ Physics: Battle-tested, http://www.havok.com/uploads/Havok_Physics_Brief_Mar%209.pdf, Mar. 2010, 2 pages.

Nealen, et al., "Physically Based Deformable Models in Computer Graphics," EUROGRAPHICS 2005, 23 pages, 2005.

Phun-2D physics sandbox—About, algoryx, "PHUN, 2D physics sandbox." Aug. 5, 2008, 2 pages.

Phun-2D physics sandbox—Home, algoryx, "PHUN, 2D physics sandbox," Sep. 7, 2009, 2 pages.

"MyPhysicsLab—Physics Simulation with Java," downloaded from www.myphysicslab.com on Feb. 12, 2011, 4 pages.

Wikipedia, "JellyCar (iPhone app)," Jan. 16, 2011, 2 pages.

Wikipedia, Algodoo, downloaded on Feb. 12, 2011, 3 pages.

Algodoo by algoryz, downloaded on Feb. 12, 2011, 2 pages.

Nealen, et al., "Physically Based Deformable Models in Computer Graphics," Eurographics 2005, 24 pages, Sep. 2005.

Plun-2D physics sandbox-About, algoryx, "Phun, 2D physics sandbox," Aug. 5, 2008, 2 pages.

Phun-2D physics sandbox-Home, algoryx, "Phun, 2D physics sandbox," Sep. 7, 2009, 2 pages.

Wiipedia, "Phun," downloaded on Feb. 12, 2011, 3 pages.

\* cited by examiner

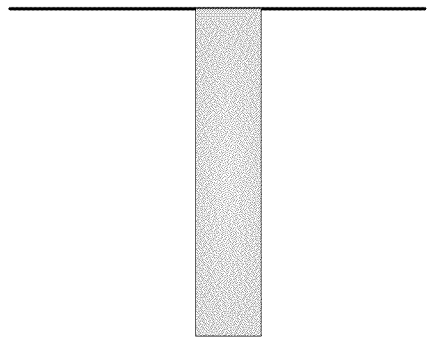
*FIG. 7A*
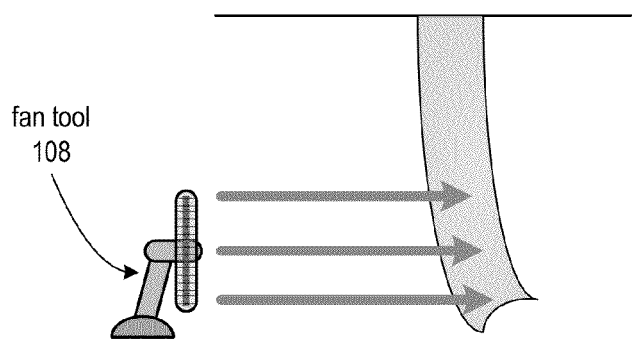
*FIG. 7B*
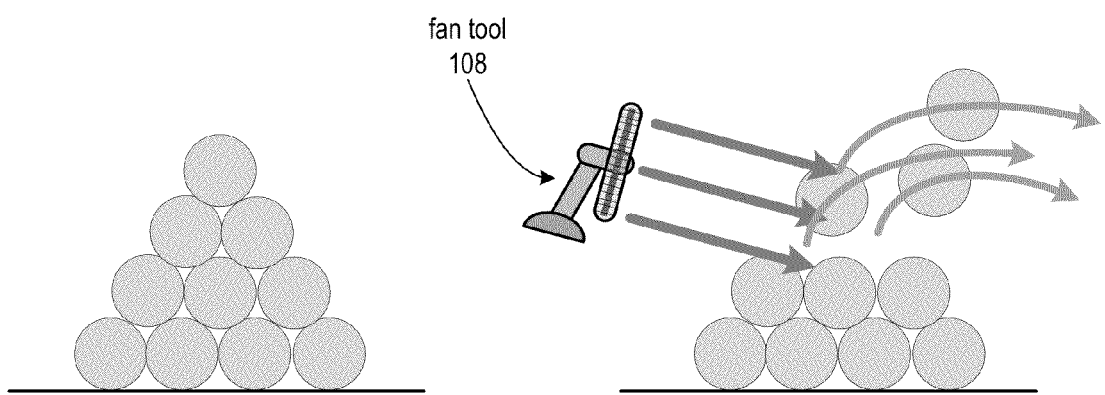
*FIG. 8A*  *FIG. 8B*

PHYSICAL SIMULATION TOOLS FOR TWO-DIMENSIONAL (2D) DRAWING ENVIRONMENTS

BACKGROUND

Description of the Related Art

Special visual effects techniques, used for feature films, video games, and so on, offer a wide array of physical simulation effects, including smashing objects, blowing smoke, splashing water, and so on. Conventional methods for generating these effects, however, typically require very specialized software and complex 3D modeling that is not easily accessible to designers, artists, or others using conventional two-dimensional (2D) drawing tools.

Various physical simulation techniques have been proposed. However, these conventional physical simulation techniques typically assume a complex 3D environment for setting up the simulation, and do not provide easily accessible and intuitive tools for applying the simulations on 2D designs.

There are 2D games and "sandbox" applications that are based on physical simulations. However, these games and applications concentrate primarily on simple mechanics demonstration, and do not provide simulations that actually modify objects as editing tools.

Commercial simulation engines are available for game design. However, conventional commercial simulation engines typically assume a complex 3D modeling setup, and typically do not provide simple and intuitive tools.

SUMMARY

Various embodiments of methods and apparatus for simulating various physical effects on 2D objects in two-dimensional (2D) drawing environments are described. Embodiments may, for example, be implemented as or in 2D art and graphics design tools or applications to provide fundamentally new ways to create art and graphics. In at least some embodiments, a set of 2D physical simulation tools may be provided for editing and enhancing vector-based or raster-based 2D art based on 2D physical simulations. Each 2D physical simulation tool may be associated with a particular 2D physical simulator that may be applied to vector-based or raster-based 2D objects using the respective tool to achieve a desired physical effect. Via a user interface, the 2D physical simulation tools may be selected and applied to selected 2D objects in an image with simple and intuitive gestures. Applying a gesture with particular 2D physical simulation tool to a selected 2D object in an image causes execution of a corresponding 2D physical simulator. The 2D physical simulator iteratively executes to apply a physics-based simulation to the selected 2D object as indicated by the gesture to achieve the corresponding physical effect.

In at least some embodiments, any one of various types of predefined physical materials or substances may be specified for a 2D object to which a 2D physical simulation tool may be applied. Each predefined material may be specified by various physical properties of the materials, such as elasticity, strength, viscosity, hardness, ignition point, and so on. However, rather than setting values for these various physical parameters manually, as in conventional physical simulations, a simple material property may be assigned to a 2D object, such as "ceramic", "metal", "rubber", "wood", etc. These simple material properties provide intuitive labels for collections of the physical properties and set expectations for what happens when the physical simulation is run based on the known behaviors of the actual physical materials.

In at least some embodiments, at least some of the 2D physical simulation tools may each have one or more tool-specific parameters that may affect the physical simulations initiated by applications of the tools to objects. In at least some embodiments, one or more of the tool-specific parameters may be adjustable to vary the physical effect caused by the respective tool. In at least some embodiments, one or more global simulation parameters may affect the operation of the physical simulators associated with the 2D physical simulation tools. In at least some embodiments, one or more of the global simulation parameters may be adjustable. The global simulation parameters are independent of the various material properties of the objects being acted upon.

Embodiments may enable the physical simulations to be executed in real-time or near-real-time as the tools are applied, thus providing immediate feedback and realistic visual effects. To achieve this, the physical simulations may be performed on 2D mesh representations, or tessellations, of the 2D objects. In addition, in at least some embodiments, computing technology, including but not limited to GPU (Graphic Processing Units) and multi-core CPUs, may be leveraged to enable the physical simulations to be executed in real-time or near-real-time. In at least some embodiments, portable parallelism libraries, such as OpenCL, and platform specific math libraries may be leveraged to provide the computational resources necessary for near-real-time or real-time performance.

In at least some embodiments of a method for applying 2D physical simulation tools to 2D objects to achieve various simulated physical effects associated with the tools, a 2D physical simulation tool may be selected. For example, a physical simulation tool may be selected from a tool palette provided by a user interface. A 2D graphic object may be selected, for example from a working digital image displayed on the user interface. In at least some embodiments, a material for the selected object may be specified, for example via a materials palette provided by the user interface. A mesh representation of the object may be generated, if necessary. The mesh breaks the arbitrary shape into small, discrete units, which may be but are not necessarily triangles, required for performing the physical simulation. To initiate a physical simulation, the user may apply the selected tool to the selected object. For example, via the user interface, the user may place the tool near a desired area of the selected object, or may apply a simple gesture, depending on the selected tool. The respective physical simulation may be applied to the object in response to the application of the tool, and the effects of the physical simulation may be displayed. Note that the physical simulation may be iteratively applied, and the effects may be, but are not necessarily, displayed at each iteration. An iteration may be defined as a single step of a physical simulation applied to an object over a particular time interval, where the time interval corresponds to the animation of the effect (e.g., $\frac{1}{30}^{th}$ of second). In at least some embodiments, for at least some tools, the physical simulation may be performed on a mesh representation of the object, rather than on the object itself.

While the 2D physical simulation tools are generally described herein in relation to simulating physical effects in static 2D images, the 2D physical simulation tools may also be extended to 2D animation. For example, in at least some embodiments, the results of each iteration of a physical simulation may be preserved, and the resulting series of results may be stored as or used to generate an animation sequence for the physical effect caused by the selected tool being applied to the object.

BRIEF DESCRIPTION OF THE DRAWINGS

FIGS. 7A-7B graphically illustrate an example physical effect that may be generated by applying an example fan tool to an object or objects, according to at least some embodiments.

FIGS. 8A-8B graphically illustrate another example physical effect that may be generated by applying an example fan tool to an object or objects, according to at least some embodiments.

Figure 1:
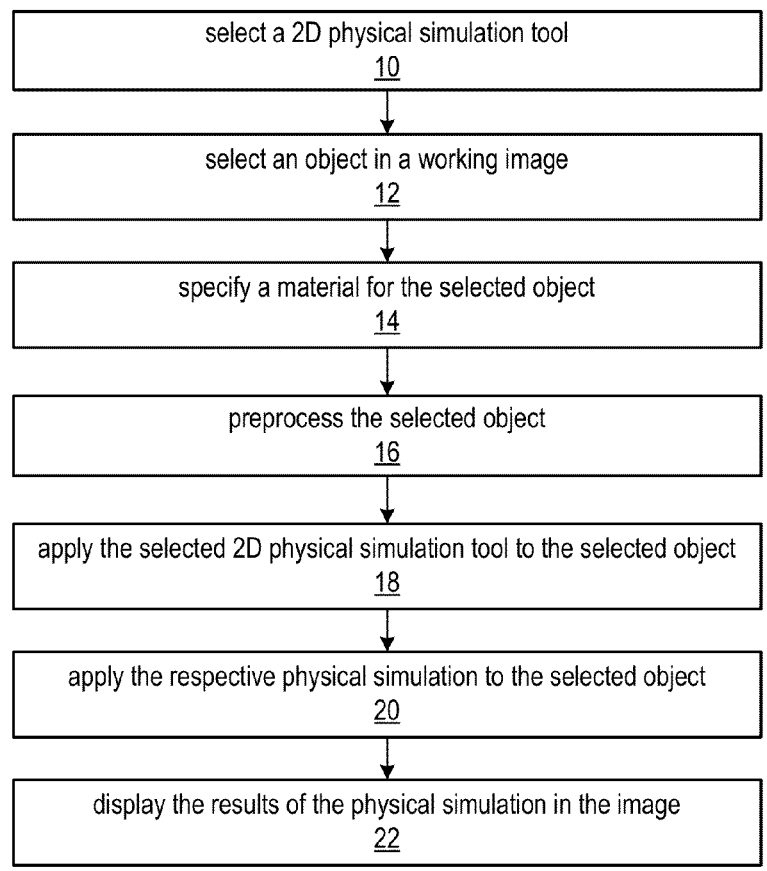
FIG. 1 is a high-level flowchart of a method for applying 2D physical simulation tools to 2D objects to achieve various simulated physical effects associated with the tools, according to at least some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for simulating various physical effects on 2D objects in two-dimensional (2D) drawing environments are described. In at least some embodiments, a set of 2D physical simulation tools may be provided for editing and enhancing vector-based or raster-based 2D art based on 2D physical simulations. Examples of physical effects and of tools used to apply the effects to objects may include, but are not limited to, cracking and/or smashing a 2D graphic object with a "hammer" or similar tool, burning an object and releasing simulated smoke with a "match" or similar tool, grabbing and stretching an elastic object with a "hook" or similar tool, and melting an object with a "heat gun" or similar tool. Various other 2D physical simulation tools (such as a "fan" or similar tool for applying wind pressure, a "pick axe" or similar tool for chipping at an object, a "knife" or similar tool for carving on an object, a "sandblaster" or similar tool for sandblasting or eroding an object, and so on), and variations of the example tools, may also be provided. Each 2D physical simulation tool may be associated with a particular 2D physical simulator that may be applied to vector-based or raster-based 2D objects using the respective tool to achieve a desired physical effect. Via a user interface, the 2D physical simulation tools may be selected and applied to 2D objects in an image with simple and intuitive gestures. Applying a gesture with particular 2D physical simulation tool to a selected 2D object in an image causes execution of a corresponding 2D physical simulator. The 2D physical simulator iteratively executes to apply a physics-based simulation to the selected 2D object as indicated by the gesture to achieve the corresponding physical effect. Results of the physics-based simulation are rendered to the image.

In at least some embodiments, at least some of the 2D physical simulation tools may each have one or more tool-specific parameters that may affect the physical simulations initiated by applications of the tools to objects. For at least some of the tools, the value of one or more of the tool-specific parameters may be determined by gesture input when applying the tool to an object, and thus may vary depending on the input. For example, the speed of a stroke used to strike an object with a hammer tool may specify a speed parameter for the hammer tool. In at least some embodiments, one or more of the tool-specific parameters may be adjustable before application of the respective tool to a selected object, for example via one or more user interface elements provided via a user interface to the 2D drawing environment. Adjusting a tool parameter may, for example, affect the speed and scope of the physical effect that application of the tool has on objects. Examples of adjustable tool parameters include, but are not limited to, the heat of a match tool or a heat gun tool, the strength or speed of the wind generated with a fan tool, and the weight of a hammer tool.

In at least some embodiments, any one of various types of predefined physical materials or substances may be specified for a 2D object to which a 2D physical simulation tool may be applied. Examples of predefined physical materials may include, but are not limited to, wood, stone, glass, ceramic, ice, rubber, plastic, paper, cloth, wax, modeling clay, metals, alloys, composites, or variations thereof. The type of material that an object is composed of may affect the operation of the particular physical simulator associated with a selected tool. For example, the style and extent of the physical simulations may be affected by various predefined physical properties of the materials, such as elasticity, strength, viscosity, hardness, ignition point, and so on. However, rather than setting values for these various physical parameters manually, as in conventional physical simulations, a simple material property may be assigned to a 2D object, such as "ceramic", "metal", "rubber", "wood", etc. These simple material properties provide intuitive labels for collections of the physical properties and set expectations for what happens when the physical simulation is run based on the known behaviors of the actual physical materials.

In at least some embodiments, one or more global simulation parameters may affect the operation of the physical simulators associated with the 2D physical simulation tools. Examples of global simulation parameters include, but are not limited to, gravity and the viscosity of the medium in which the physical simulations are performed. In at least some embodiments, one or more of the global simulation parameters may be adjustable, for example via one or more user interface elements provided via a user interface to the 2D drawing environment. For example, increasing or decreasing a gravity parameter may affect the way pieces fly away when a hammer tool is used, or the way smoke dissipates when a match tool is used, and so on. As another example, increasing or decreasing the viscosity may affect the physical effects caused by applying the tools; the physical simulations may behave differently if taking place in higher viscosity mediums such as simulated water or heavy oil than they will in lower viscosity mediums such as simulated air or vacuum. The global simulation parameters are independent of the various material properties of the objects being acted upon.

Embodiments may, for example, be implemented as or in vector-based or raster-based 2D art and graphics design tools or applications to provide fundamentally new ways to create art and graphics. The tools and materials are intuitive and behave like their real-world counterparts, and the physical simulations initiated by applying the tools to 2D objects may provide real-time feedback. By providing 2D physical simulation tools for easily and intuitively applying simulated physical effects to 2D objects, embodiments may open up new avenues of design and appearance based on realistic physical simulations to a broader audience than conventional physical simulation technologies. Tools and materials may be intuitively selected, and intuitive gestures with a tool may be used to specify how and where a physical simulation is applied to a 2D object, making the tools accessible and easy to use.

Embodiments may enable the physical simulations to be executed in real-time or near-real-time as the tools are applied, thus providing immediate feedback and realistic visual effects. To achieve this, the physical simulations may be performed on 2D mesh representations, or tessellations, of the 2D objects. Simulations run on 2D meshes are orders of magnitude simpler, both in terms of computation and memory use, than simulations typically used in 3D modeling. In addition, in at least some embodiments, computing technology, including but not limited to GPU (Graphic Processing Units) and multi-core CPUs, may be leveraged to enable the physical simulations to be executed in real-time or near-real-time. In at least some embodiments, portable parallelism libraries, such as OpenCL, and platform specific math libraries may be leveraged to provide the computational resources necessary for near-real-time or real-time performance.

While the 2D physical simulation tools are generally described herein in relation to simulating physical effects in static 2D images, the 2D physical simulation tools and the gesture-based techniques used with the tools may also be extended to 2D animation.

Figure 11:
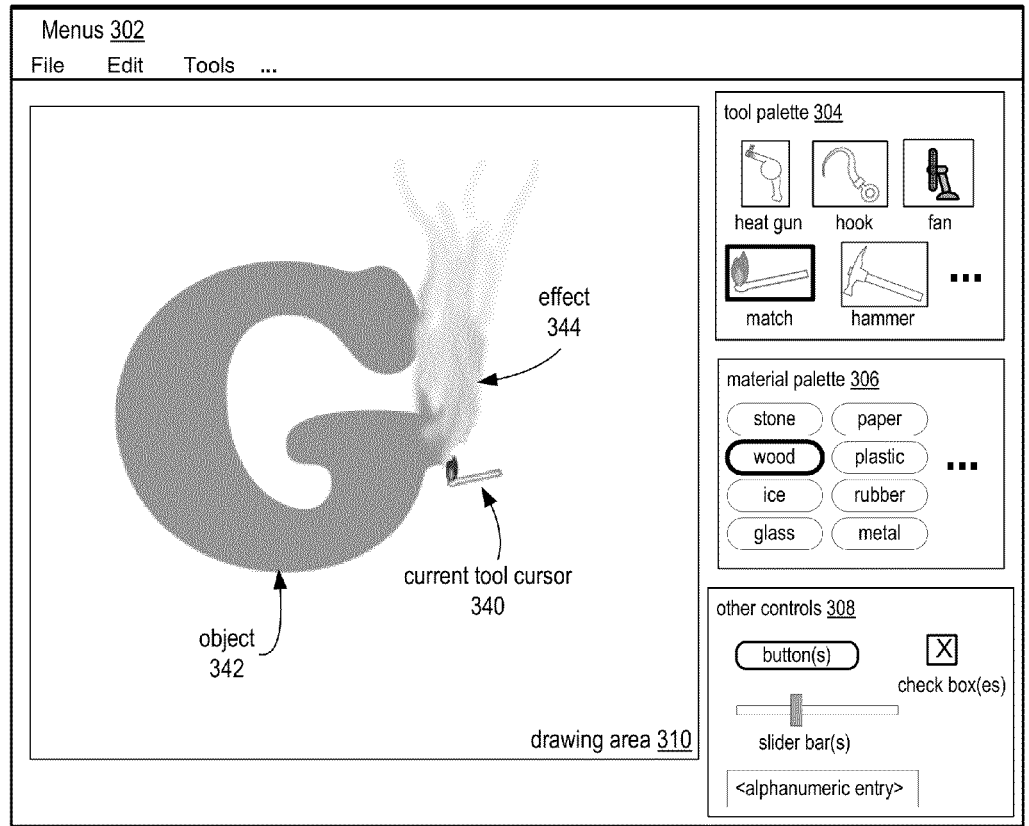
FIG. 11 illustrates an example user interface to a 2D drawing application that implements an embodiment of the method for simulating various physical effects on 2D objects as described herein.

FIG. 1 is a high-level flowchart of a method for applying 2D physical simulation tools to 2D objects to achieve various simulated physical effects associated with the tools, according to at least some embodiments. As indicated at 10, a 2D physical simulation tool may be selected. For example, a 2D physical simulation tool may be selected from a tool palette provided by a user interface. The selected 2D physical simulation tool may be associated with a particular physical simulator that may be applied to vector-based or raster-based 2D objects using the respective tool to achieve a desired physical effect. FIG. 11 shows an example user interface that includes a tool palette 304 from which a 2D physical simulation tool, such as a hammer, a hook, a match, a heat gun, or a fan, may be selected. In at least some embodiments, a selected 2D physical simulation tool may have one or more tool-specific parameters that may be adjusted to differently affect the physical simulations initiated by application of the tool to selected objects. A user interface, such as the example user interface of FIG. 11, may include one or more user interface elements via which the user may specify or change one or more tool-specific parameters of a selected 2D physical simulation tool.

Figure 2:
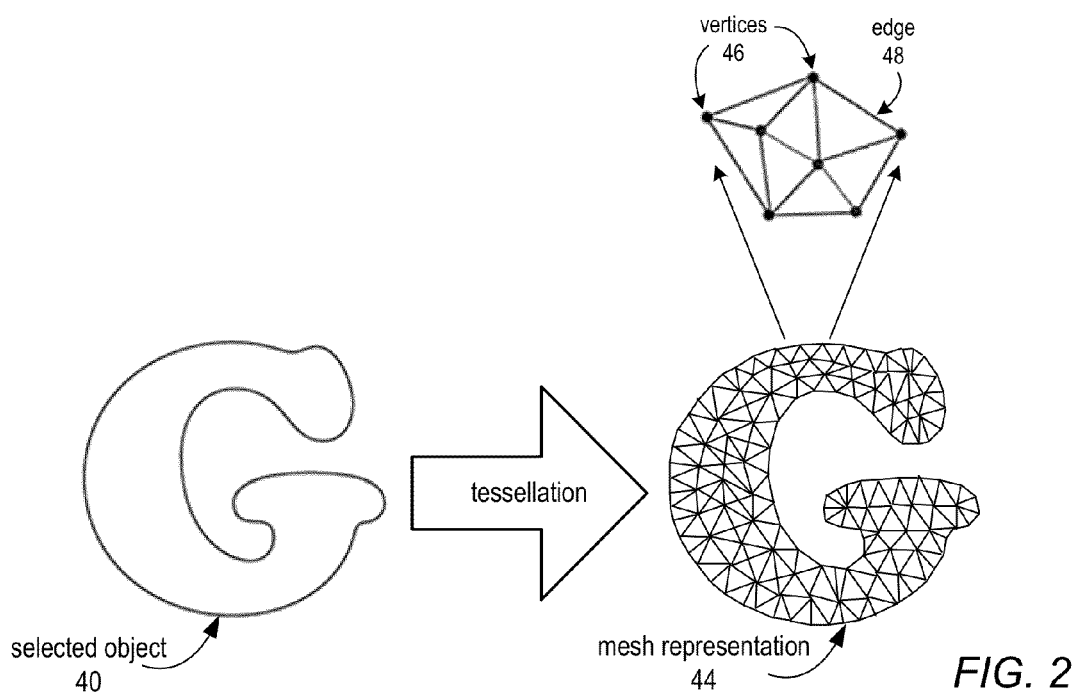
FIG. 2 illustrates an example of applying tessellation to a selected 2D object to generate a mesh representation, or tessellation, of the object.

As indicated at 12 of FIG. 1, a 2D graphic object may be selected in a working image. As indicated at 14, in at least some embodiments, a material for the selected object may be specified, for example via a materials palette 306 as illustrated in FIG. 11. As indicated at 16, the selected object may be preprocessed, as necessary or desired. For example, preprocessing a selected 2D object may involve building a mesh representation of the object, if necessary. The mesh breaks the arbitrary shape into small, discrete units, which may be but are not necessarily triangles, required for performing the physical simulation. The process of building a mesh for an object may be referred to as tessellation. FIG. 2 illustrates an example of applying a tessellation technique to a selected object 40 (a 2D graphics object representing a capital "G") to generate a mesh representation 44, or tessellation, of the object 40. Mesh representation 44 may be a geometric representation of the object 40. For example, as shown by the zoomed-in portion of mesh representation 44 in FIG. 2, the mesh representation 44 may be defined by a plurality of vertices 46, with each vertex 46 connected to at least two other vertices by edges 48. Edges 48 may be, but are not necessarily, defined as Bezier curves. Since embodiments apply 2D physical simulations to 2D objects, the mesh representation 44 may be a 2D geometric representation, and thus vertices 46 may be defined as 2D points. Note that this example is not intended to be limiting. For example, the tessellation of an object may generally, but not necessarily, be much more fine-grained than the example given in FIG. 2. In at least some embodiments, an adaptive tessellation technique may be employed. In adaptive tessellation, the density of the mesh may be increased at certain parts of an object, for example parts of the object where a physical simulation initiated by a selected tool is concentrated, or parts of an object where the 2D shape of the object is more complex.

As indicated at 18 of FIG. 1, to initiate a physical simulation, the user may apply the selected tool to the selected object using a simple gesture. For example, via a user interface, the user may place the tool near a desired area of the selected object, or may apply a stroke gesture with the tool; the particular gesture used may depend on the selected tool and on the effect that the user desires to achieve with the selected tool. In at least some embodiments, applying a tool to an object may involve moving a cursor representing the respective tool on or near a selected object via a cursor control device, and may also involve depressing, holding, and releasing one or more buttons on the cursor control device and/or on a keyboard. Example user interfaces for applying the 2D physical simulation tools are illustrated in FIG. 11 and FIGS. 12A-12C. Note that these user interfaces may be controlled using cursor control devices such as a mouse or alternatively via touch-enabled or multitouch-enabled devices. As indicated at 20, the respective physical simulation may be applied to the object in response to the application of the tool. In at least some embodiments, for at least some tools, the physical simulation may be performed on a mesh representation of the object, rather than on the object itself. As indicated at 22, effects of the physical simulation applied to the object may be rendered and displayed in the working image. The resulting object, modified according to the physical simulation, may be output to the working image. The working image may, for example, be printed, stored, or further processed according to the 2D physical simulation tools or other 2D drawing tools as necessary or desired.

In at least some embodiments, the physical simulation may be iteratively applied to the object, and the effects of the physical simulation may be, but are not necessarily, rendered and displayed at each iteration. An iteration may be defined as a single step of a physical simulation applied to an object over a particular time interval, where the time interval corresponds to the animation of the effect (e.g., $\frac{1}{30}^{th}$ or $\frac{1}{60}^{th}$ of second, or some other interval). In at least some embodiments, the results of each iteration of a physical simulation may be preserved, and the preserved series of results may be stored as or used to generate an animation sequence for the physical effect caused by the selected tool being applied to the object.

FIGS. 3A through 9D graphically illustrate example physical effects that may be generated by applying example physical simulations to objects with example 2D physical simulation tools, according to at least some embodiments. FIGS. 3A through 9D also show examples of gestures that may be used to apply the example 2D physical simulation tools to selected objects. These Figures are given by way of example, and are not intended to be limiting. Various other tools (such as a "pick axe" tool for chipping at an object, a "knife" tool for carving on an object, a "sandblaster" tool for sandblasting an object, and so on), and variations of the example tools shown in FIGS. 3A through 9D, may also be provided.

Figure 3A:
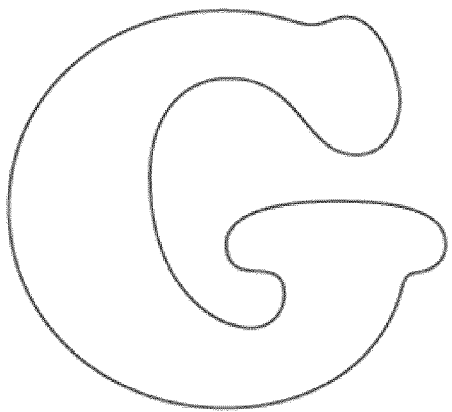
FIGS. 3A through 3C graphically illustrate example physical effects that may be generated by applying an example hammer tool to an object, according to at least some embodiments.
Figure 3B:
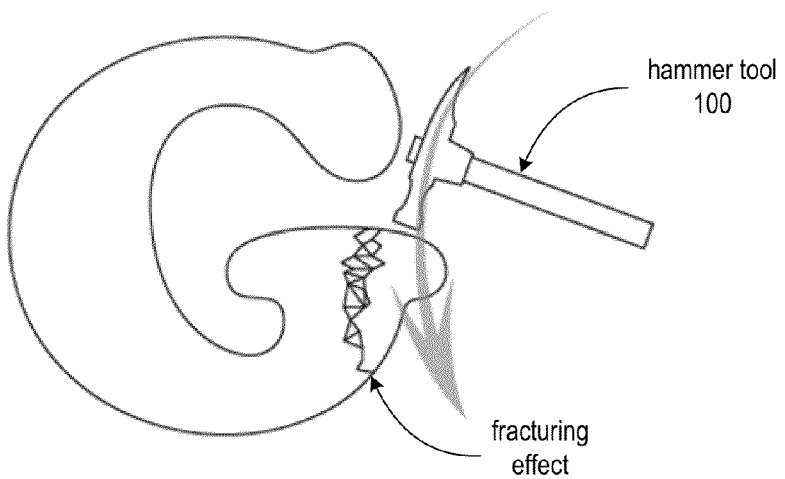
Figure 3C:
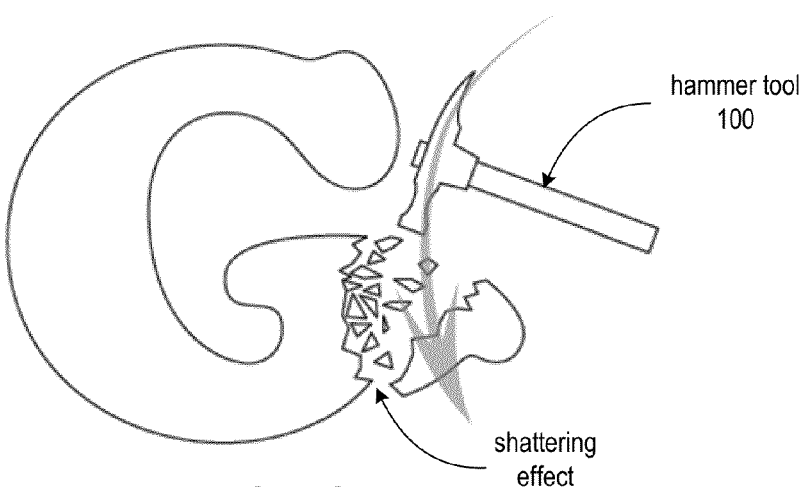

FIGS. 3A through 3C graphically illustrate example physical effects that may be generated by applying an example hammer tool to an object, according to at least some embodiments. The hammer tool may be applied by swinging the hammer across or onto a selected object, thus striking the object with the hammer. At the point of contact, a brittle fracture simulation may be initiated, creating cracks and fissures in the object where the hammer impacted it. FIG. 3A shows a 2D graphics object representing a capital "G". A mesh representation or tessellation of the object may be generated, as shown in FIG. 2. FIG. 3B shows a hammer tool 100 being applied to the object via a striking gesture, represented by the gray arrow. Applying the hammer tool 100 to the object initiates a fracturing physical simulation, which is applied to the mesh representation. The physical simulation creates a fracturing effect on the object, as illustrated in FIG. 3B. FIG. 3C shows results of a subsequent strike on the object using the hammer tool 100, which causes the fractured pieces of the object to separate and scatter in different directions. Thus, in this example, a first strike starts the fracture, and multiple strikes cause pieces of the fractured object to separate. In at least some embodiments, one or more global simulation parameters, such as gravity and viscosity, may affect the operation of the physical simulator associated with the hammer tool 100. In at least some embodiments, one or more of the global simulation parameters may be adjusted to vary the physical effect caused by the hammer tool 100. For example, increasing or decreasing a gravity parameter may affect the way pieces fly away when the hammer tool 100 is used. In at least some embodiments, the hammer tool 100 may have one or more tool-specific parameters, such as weight and speed, that may affect the physical simulation initiated by application of the hammer tool to objects. For example, the speed of an input stroke used to strike an object with the hammer tool 100 may specify a speed parameter for the hammer tool 100.

The effects of the hammer tool 100 on an object may vary depending on the properties of the material that composes the object. For example, depending on the material properties, the object may be deformed somewhat before breaking.

Figure 4A:
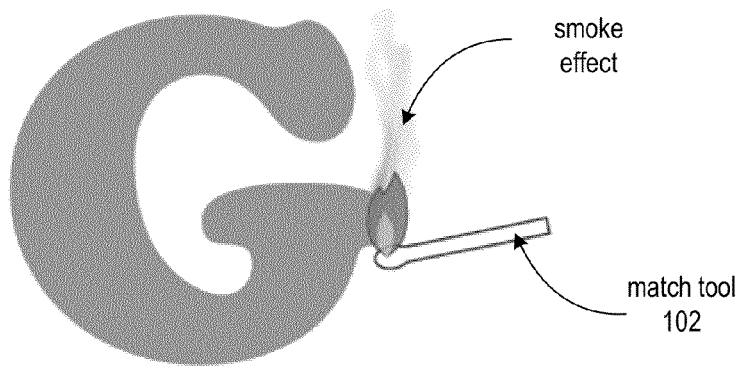
FIGS. 4A through 4C graphically illustrate example physical effects that may be generated by applying an example match tool to an object, according to at least some embodiments.
Figure 4B:
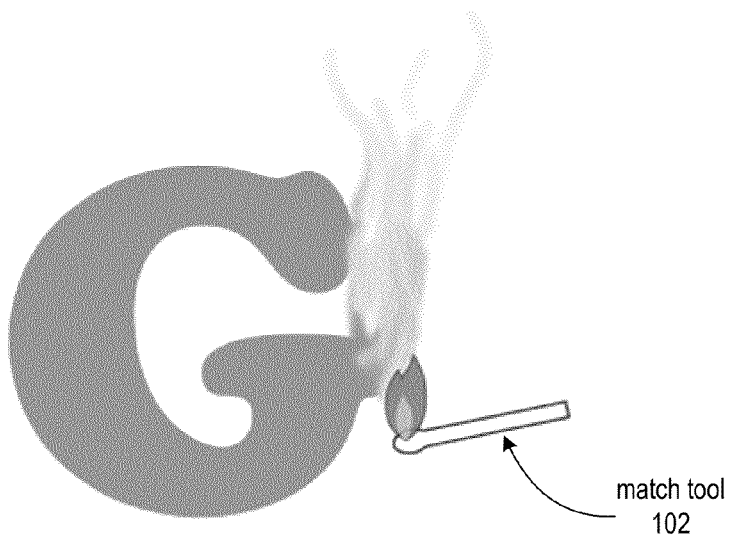
Figure 4C:
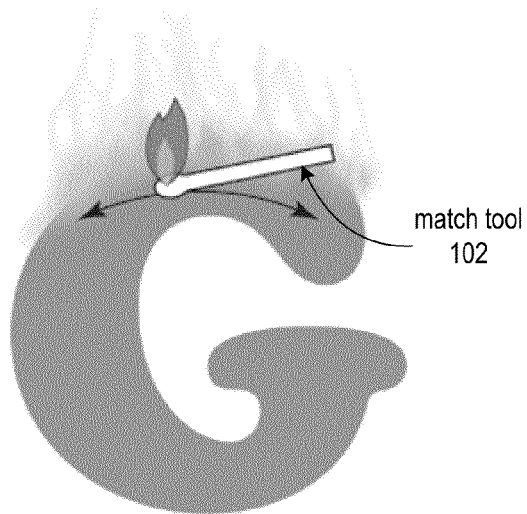

FIGS. 4A through 4C graphically illustrate example physical effects that may be generated by applying an example match tool to an object, according to at least some embodiments. As shown in FIG. 4A, applying the match tool 102 to an object may cause smoke to rise from the area that the match tool 102 is positioned near. Holding the match tool 102 in place continues the simulation, generating additional smoke, as shown in FIG. 4B. Moving the smoke tool 102 back and forth across the object applies the smoke effect to a larger area, as shown in FIG. 4C. While the match tool 102 is described as generating smoke, a match tool 102 may also be used to generate flame.

The effects of the match tool 102 on an object may vary depending on the properties of the material that composes the object. For example, depending on the material properties, the object may smoke more or less, or may burst into flame after a period of continuous application of the match. In addition, in at least some embodiments, one or more global simulation parameters, such as gravity, may affect the operation of the physical simulator associated with the match tool. In at least some embodiments, one or more of the global simulation parameters may be adjusted to vary the physical effect caused by the match tool. For example, increasing or decreasing a gravity parameter may affect the way smoke rises and dissipates the match tool is used. In at least some embodiments, the match tool may have one or more tool-specific parameters, such as heat, that may affect the physical simulation initiated by application of the match tool to objects.

Figure 5A:
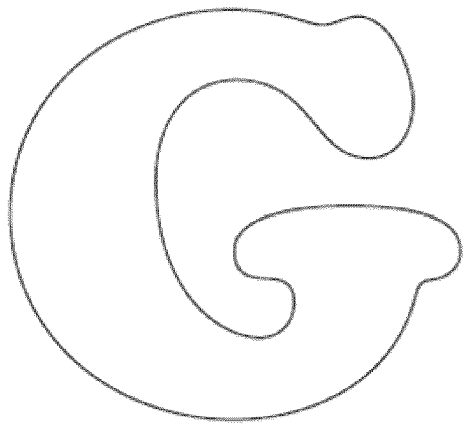
FIGS. 5A through 5C graphically illustrate example physical effects that may be generated by applying an example hook tool to an elastic object, according to at least some embodiments.
Figure 5B:
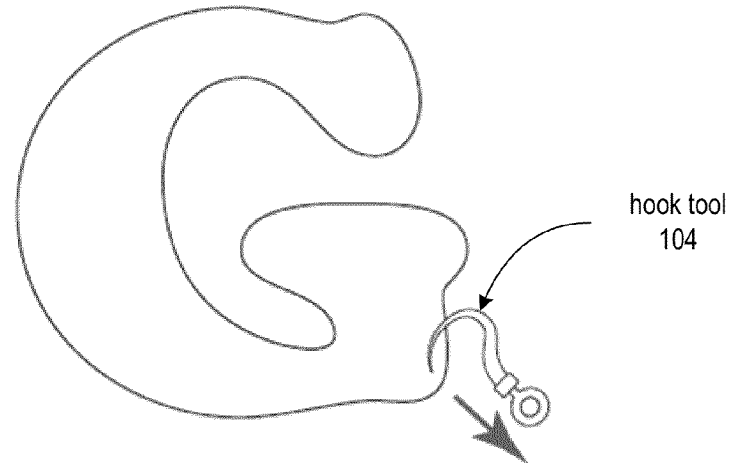
Figure 5C:
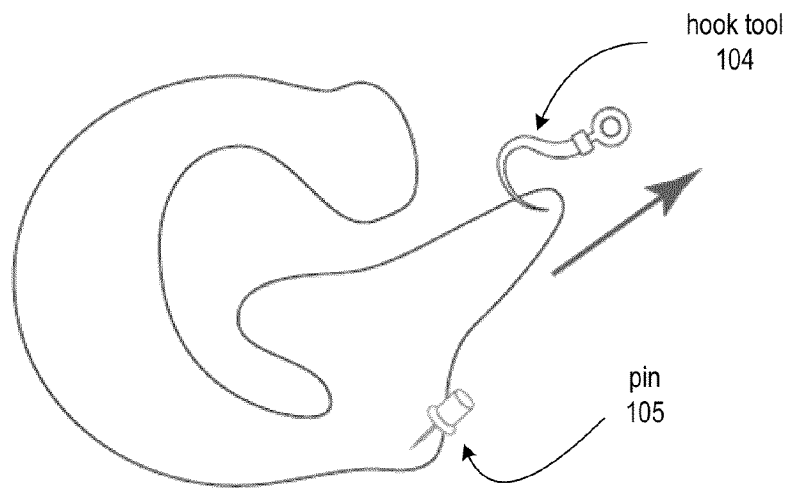

FIGS. 5A through 5C graphically illustrate example physical effects that may be generated by applying an example hook tool to an elastic object, according to at least some embodiments. FIG. 5A shows a 2D graphics object representing a capital "G". A mesh representation or tessellation of the object may be generated, as shown in FIG. 2. The properties of the material composing the object may allow the object to be stretched, as if the object was an elastic sheet. As shown in FIG. 5B, the hook tool 104 may be positioned on a point on the selected object. The user may then click and drag the hook tool 104; in response, the object stretches and bunches around the tip of the hook, just like an actual elastic sheet would. In at least some embodiments, when the user lets up on the hook tool 104, releasing the object, a pin 105 may be placed where the hook last was, as shown in FIG. 5C. In FIG. 5C, the user has released the initial point grabbed by the hook 104 in FIG. 5B, which pins the object at that point, and has moved the hook tool 104 to another point on the object and stretched that portion of the object. In at least some embodiments, a pin 105 can optionally be deleted, for example by a double-click of a mouse button or by a keyboard command, allowing the object to snap back into place. In at least some embodiments, if the object is stretched beyond a threshold, the object may tear, to simulate the effect of a real object tearing when stretched.

The effects of the hook tool 104 on an object may vary depending on the properties of the material that composes the object. For example, depending on the material properties, the object may stretch more or less before tearing. In addition, in at least some embodiments, one or more global simulation parameters may affect the operation of the physical simulator associated with the hook tool. In at least some embodiments, one or more of the global simulation parameters may be adjusted to vary the physical effect caused by the hook tool. In at least some embodiments, the hook tool may have one or more tool-specific parameters that may affect the physical simulation initiated by application of the hook tool to objects.

Figure 6A:
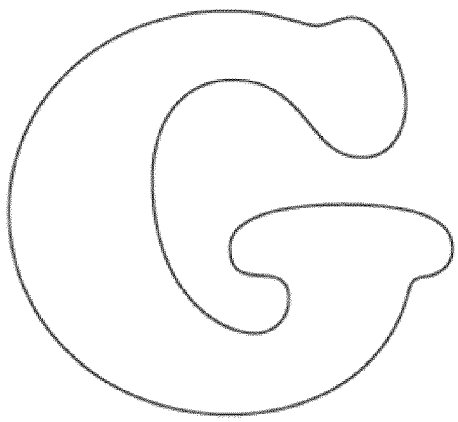
FIGS. 6A through 6C graphically illustrate example physical effects that may be generated by applying an example heat gun tool to an object, according to at least some embodiments.
Figure 6B:
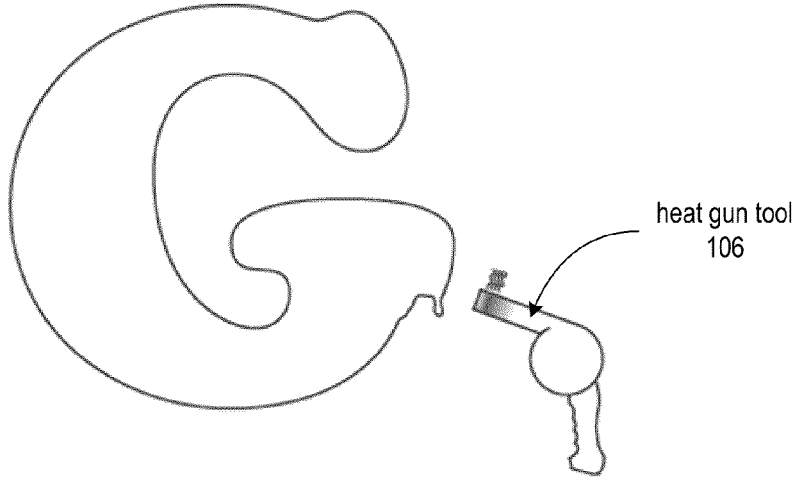
Figure 6C:
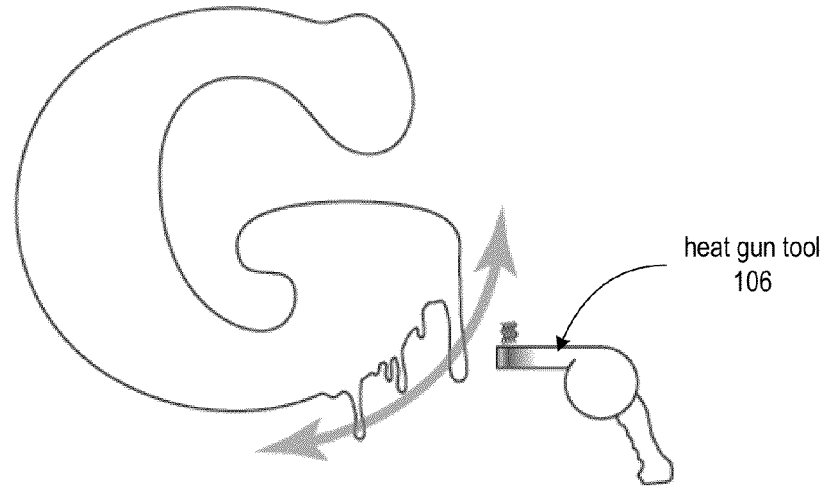

FIGS. 6A through 6C graphically illustrate example physical effects that may be generated by applying an example heat gun tool to an object, according to at least some embodiments. Using the heat gun tool 106, a heating simulation runs as the tool 106 is held to an object. Movement of the tool 106 applies the simulation to a larger area, similarly to the match tool. FIG. 6A shows a 2D graphics object representing a capital "G". A mesh representation or tessellation of the object may be generated, as shown in FIG. 2. As shown in FIG. 6B, holding the heat gun tool 106 near the edge of an object may cause the object to begin to sag and melt, eventually forming drips and running downward. If the heat gun tool 106 is held in one spot, the simulation focuses on that one spot and becomes more pronounced as it is held there. To apply the heating effect to a broader area, the heat gun tool 106 may be moved back and forth across the object, as shown in FIG. 6C.

The effects of the heat gun tool 106 on an object may vary depending on the properties of the material that composes the object. For example, depending on the material properties, the object may melt more or less rapidly. In at least some embodiments, one or more global simulation parameters, such as gravity and viscosity, may affect the operation of the physical simulator associated with the heat gun tool. In at least some embodiments, one or more of the global simulation parameters may be adjusted to vary the physical effect caused by the heat gun tool. For example, increasing or decreasing a gravity parameter may affect the way the object sags when applying the heat gun tool. In at least some embodiments, the heat gun tool may have one or more tool-specific parameters, such as heat, that may affect the physical simulation initiated by application of the heat gun tool to objects.

FIGS. 7A-7B and 8A-8B graphically illustrate example physical effects that may be generated by applying an example fan tool to an object or objects, according to at least some embodiments. The fan tool 108 works by blowing wind on an object or objects, causing an object to flutter and deform as the wind pressure affects the object, or alternatively causing the object(s) to blow away. FIGS. 7A and 7B illustrate the effect of a fan tool 108 blowing on a hanging object. FIG. 7A shows an example object, such as a cloth or paper curtain, drape, or banner. FIG. 7B shows the effect of applying the fan tool 108 to the object, which causes the object to flutter and deform. FIGS. 8A and 8B illustrate the effect of a fan tool 108 blowing on a collection of loose objects. FIG. 8A illustrates a pile of 2D objects. FIG. 8B the effect of applying the fan tool 108 to the pile of objects, which causes several of the object to blow off the pile.

The effects of the fan tool 108 on an object may vary depending on the properties of the material that composes the object. For example, depending on the material properties, the object may flutter and deform more or less. In at least some embodiments, one or more global simulation parameters, such as gravity and viscosity, may affect the operation of the physical simulator associated with the fan tool. In at least some embodiments, one or more of the global simulation parameters may be adjusted to vary the physical effect caused by the fan tool. For example, increasing or decreasing a gravity parameter and/or a viscosity parameter may affect the way objects move or flutter when the fan tool is used. In at least some embodiments, the fan tool may have one or more tool-specific parameters, such as wind speed, that may affect the physical simulation initiated by application of the fan tool to objects.

Figure 9A:
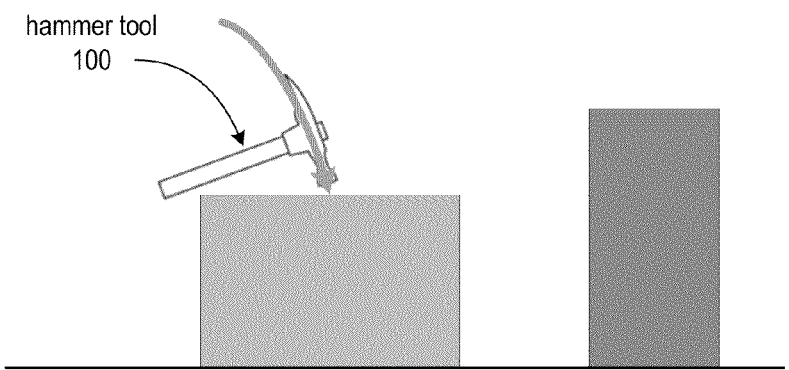
FIGS. 9A through 9D graphically illustrate other objects on an image affecting and/or being affected by the application of a 2D physical simulation tool to a selected object.
Figure 9B:
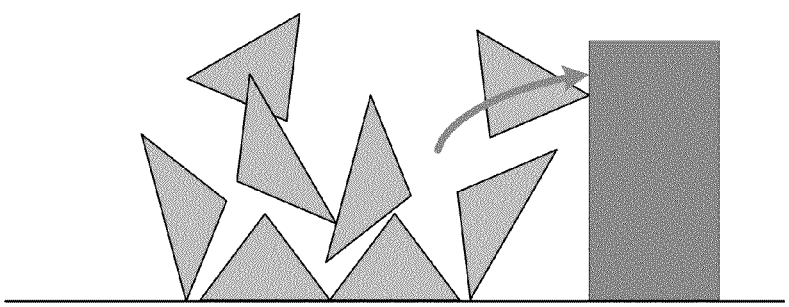
Figure 9C:
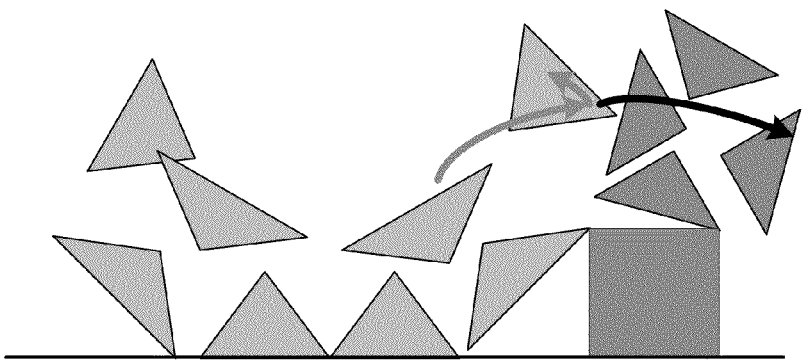
Figure 9D:
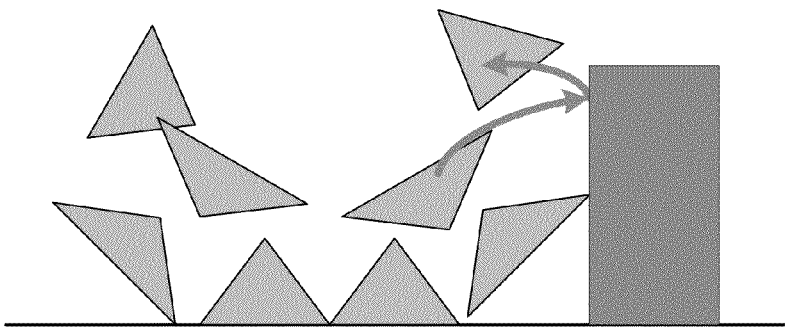

In at least some embodiments, other objects on an image may affect and/or be affected by the application of a tool to a selected 2D object. For example, smoke rising from an object to which the match tool 102 is applied, as shown in FIGS. 4A through 4C, may curl around one or more objects above the selected object. As another example, pieces shattered from an object using the hammer tool 100 may affect and/be affected by nearby objects, as shown in FIGS. 9A through 9D. FIG. 9A shows two rectangular objects, with the hammer tool 100 being applied to strike a blow on the object on the left. FIG. 9B shows that the physical simulation initiated by the hammer tool 100 striking the object on the left in FIG. 9A has caused the object to shatter and fly apart. One of the pieces of the object strikes the object on the right, as shown by the arrow in FIG. 2B. FIG. 9C shows that the piece of the shattered object striking the object on the right has caused the struck object itself to shatter and to being to fly apart. FIG. 9D shows that, alternatively, the striking piece may instead bounce off the struck object. As previously noted in reference to FIGS. 3A-3C, in at least some embodiments, one or more global simulation parameters, such as gravity and viscosity, may affect the operation of the physical simulator associated with the hammer tool. In at least some embodiments, one or more of the global simulation parameters may be adjusted to vary the physical effect caused by the hammer tool. In at least some embodiments, the hammer tool may have one or more tool-specific parameters, such as weight, that may affect the physical simulation initiated by application of the hammer tool to objects.

Figure 10:
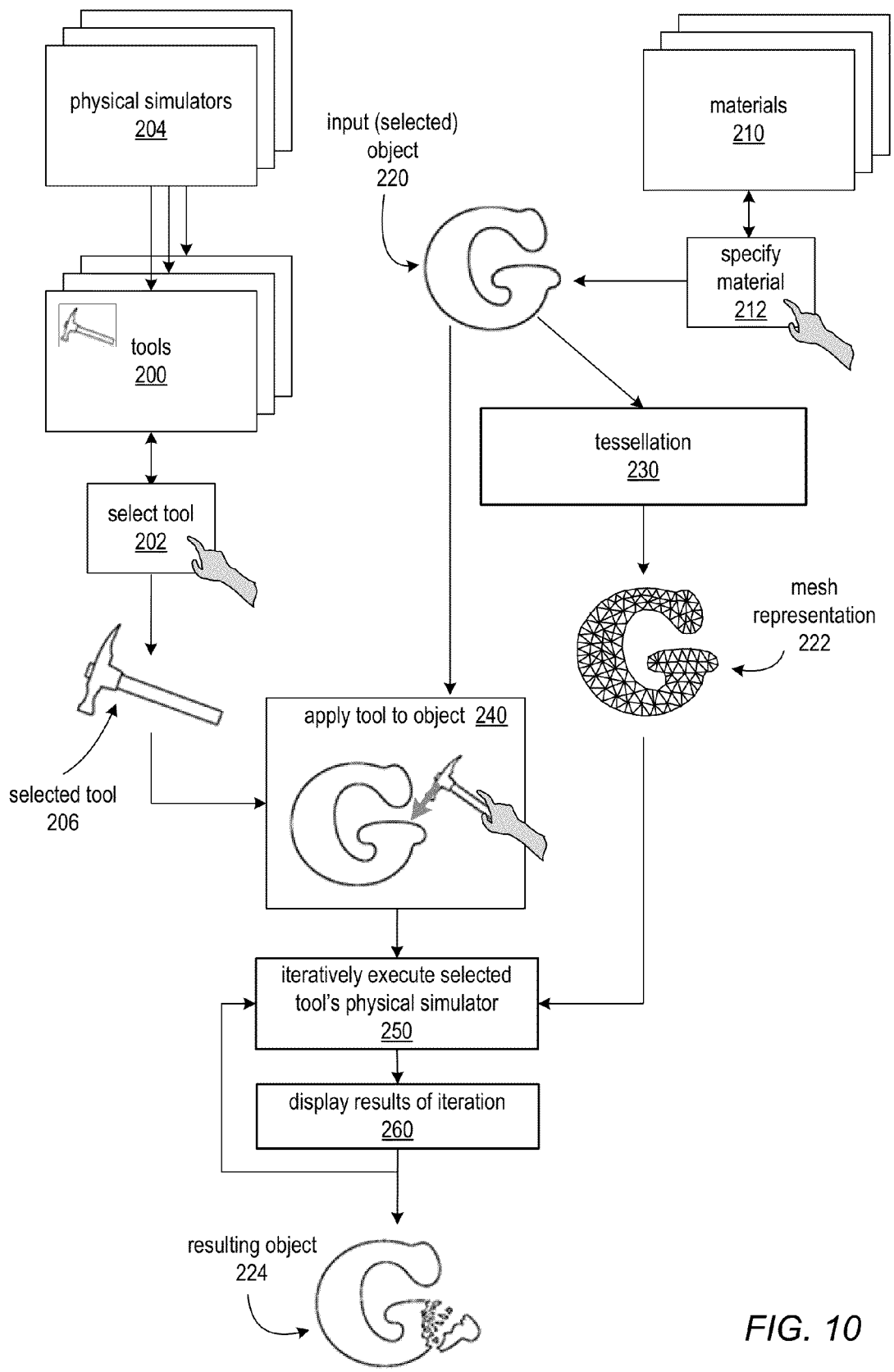
FIG. 10 is a block diagram illustrating a method for simulating various physical effects on 2D objects in a 2D drawing environment, according to at least some embodiments.

FIG. 10 is a block diagram illustrating a method for simulating various physical effects on 2D objects in a 2D drawing environment, according to at least some embodiments. In this Figure, the elements indicated by the figure of a hand indicate actions that may involve receiving user input. In embodiments, a working image including one or more objects may be displayed on a user interface. An object 220 in the image may be selected via user input, for example by mouse-clicking on the object 220 in the image, or by some other user interface technique. As shown at element 212, one of a plurality of different types of materials 210 may be specified for the object 220, for example via user input to a materials palette 306 as illustrated in FIG. 11. Each material 210 may be predefined by values for a set of properties, such as elasticity, strength, viscosity, hardness, ignition point, and so on. Thus, embodiments may store and maintain a set of material definitions, each material definition specifying values for a set of physical properties and corresponding to one of the predefined materials. Examples of predefined materials may include, but are not limited to, wood, stone, glass, ceramic, ice, rubber, plastic, paper, cloth, wax, modeling clay, metals, alloys, composites, or variations thereof.

As shown at element 202, one of a plurality of different 2D physical simulation tools 200 may be selected. For example, a physical simulation tool 200 may be selected from a tool palette provided by a user interface. FIG. 11 shows an example user interface that includes a tool palette 304 from which a 2D physical simulation tool, such as a hammer, a hook, a match, a heat gun, or a fan, may be selected. In FIG. 10, the hammer tool has been selected as the selected tool 206.

Each 2D physical simulation tool 200 may be associated with at least one of a plurality of physical simulators 204. The physical simulators 204 may, for example, be implemented as a library of physical simulation functions, or as physical simulation functions or modules implemented within a 2D drawing application that implements the method for simulating various physical effects on 2D objects as described herein. Thus, for the example tools described herein (a hammer tool, a hook tool, a match tool, a heat gun tool, and a fan tool), each of the tools is associated with a corresponding physical simulator 204 (i.e., a fracturing simulator for the hammer tool, a stretching simulator for the hook tool, a fire/smoke simulator for the match tool, a melting simulator for the heat gun tool, and a wind effect simulator for the fan tool). Other 2D physical simulation tools are possible, and each of those tools would be associated with a physical simulator 204 that simulates the physical effect initiated by application of the respective tool.

At least some embodiments may implement or leverage one or more physics-based physical simulation techniques as physical simulators 204, or variations thereof. For example, the physical simulator associated with the hook tool, or with other tools, may be implemented according to one or more techniques described in U.S. Pat. No. 6,911,980, titled "MANIPULATION OF CURVES AND SURFACES," which is incorporated by reference herein in its entirety, and/or according to one or more techniques described in U.S. Pat. No. 7,385,612, titled "DISTORTION OF RASTER AND VECTOR ARTWORK," which is incorporated by reference herein in its entirety. Other physical simulation techniques that may be used in the physical simulator associated with the hook tool, or with other tools, are described in Platt, J. C. and Barr, A. H., "Constraint methods for flexible models," *Computer Graphics (Proc. SIGGRAPH)*, vol. 22, pp. 279-288, 1988, which is incorporated by reference herein in its entirety. Physical simulation techniques that may, for example, be used with the match tool or with other tools are described in Deusen, O., et al., "The Elements of Nature: Interactive and Realistic Techniques," *ACM SIGGRAPH* 2004 *Course Note* #31, August 2004, which is incorporated by reference herein in its entirety. The physical simulator associated with the hammer tool, or with other tools, may be implemented according to one or more techniques described in O'Brien, J. and Hodgins, J., "Graphical models and animation of brittle fracture," *Proceedings of SIGGRAPH '99*, pages 137-146, 1999, which is incorporated by reference herein in its entirety, and/or according to one or more techniques described in O'Brien, J., Bargteil, A., and Hodgins, J., "Graphical modeling and animation of ductile fracture," *Proceedings of SIGGRAPH* 2002 (2002), pp. 291-294, which is incorporated by reference herein in its entirety.

As shown at element 230 of FIG. 10, tessellation may be performed on the selected object 220 to generate a mesh representation 222 of the object 220. In at least some embodiments, the material 210 selected for the object may affect the generation of the mesh representation 222, as different mesh representations may be used for different types of materials. For example, a finer-grained material may be represented by a finer mesh, while a coarser-grained material may be represented by a coarser mesh.

Generally, embodiments are directed to vector-based images and objects, and therefore selected object 220 is a vector-based object. Any of various tessellation techniques may be applied to vector-based objects to generate mesh representation 222. However, at least some embodiments may also be applied to raster-based images and objects, and thus selected object 220 may be a raster-based objects. In some embodiments, to generate a mesh representation 222 of a raster-based object, a mask (e.g., a bit mask) corresponding to the object may be obtained or generated. A mask, for example, defines what parts of the corresponding object are visible. The mesh representation 222 may then be generated from the mask, rather than from the raster-based object. Other techniques for generating a mesh representation 222 for a raster-based object may be used in other embodiments.

In at least some embodiments, an adaptive tessellation technique may be employed. In adaptive tessellation, the density of the mesh may be increased at certain parts of an object 220 where the physical simulation initiated by a selected tool 206 is concentrated (e.g., the impact point of a hammer tool, the heating zone of a heat gun tool, etc.). In addition, adaptive tessellation may be applied where the 2D shape of an object 220 becomes more complex. U.S. Pat. No. 7,385,612, titled "DISTORTION OF RASTER AND VECTOR ARTWORK," which is incorporated by reference in its entirety, describes example adaptive tessellation techniques that may be used in some embodiments.

As shown at element 240 of FIG. 10, the selected tool 206 (in this example, a hammer tool) may be applied to the object 220. The technique used to apply the selected tool 206 to the object 220 may vary depending on the tool. For example, via a user interface, the user may place the tool 206 cursor near a desired area of the selected object, or may apply a relatively simple gesture, depending on the selected tool 206. In at least some embodiments, applying a gesture to an object using a tool 206 may involve moving a cursor representing the respective tool 206 on or near the selected object 220 via a cursor control device, and may, but does not necessarily, involve depressing, holding, and releasing one or more buttons or other controls on a cursor control device and/or on a keyboard. Example user interfaces and techniques for applying gestures using the 2D physical simulation tools are illustrated in FIG. 11 and FIGS. 12A-12C. Note that these user interfaces may be controlled using cursor control devices such as a mouse or alternatively via touch-enabled or multi-touch-enabled devices. Example gestures may include, but are not limited to: positioning a cursor representing the respective tool 206 on or near the selected object 220 and holding a mouse button down for a period, with the respective physical effect being applied to a respective position on the object 220 for the duration of the mouse down event, and a stroke gesture where the cursor representing the respective tool 206 is moved on or near the object while holding a mouse button down. FIGS. 3A through 9D show examples of gestures that may be used to apply the various 2D physical simulation tools to selected objects. Note that the gestures, and the effects thereof, may vary depending on the selected tool 206. For example, a stroke gesture with a hammer tool may have the effect of striking the object at a position intersected by the stroke, a stroke gesture with a match tool may have the effect of applying the physical simulation (smoke) along the stroke, and a stroke-like gesture with the hook tool may have the effect of grabbing and stretching the object.

Applying the selected tool 206 at element 240 may initiate execution of the selected tool's respective physical simulator 204, as shown at 250. In at least some embodiments, the mesh representation 222 of the object may be passed to the physical simulator 204 as a geometric representation of the object on which the physical simulation is to be performed. Other information may also be passed to the physical simulator 204, such as values for one or more global simulation parameters, values for one or more tool-specific parameters, and the type of material that the object 220 is composed of or alternatively one or more parameter of the material. Information about the gesture used to apply the tool, such as a location on or near the object 220 and a velocity and vector or direction of the gesture, may also be passed to the physical simulator. In general, any information about the object 220, gesture, and image (e.g., a directional vector or vectors that indicates which direction in the image is up in relation to the object 220) necessary to perform the physical simulation may be passed to, or otherwise obtained by, the physical simulator 204.

The selected tool's respective physical simulator 204 may be iteratively applied to the object, and at each iteration the results of the physical simulation may be, but are not necessarily rendered and displayed in the working image on the display device, as indicated at element 260. The iterative execution of the physical simulator 204 may, for example, end when the effect caused by application of the tool 206 has completed, for example when all the pieces of an object 220 shattered by a hammer have settled. Note that, for some tools 200 such as the match tool, the heat gun tool, and the fan tool, the tool's respective physical simulator 204 may execute at least as long as the tool is being applied to the object, with additional information (e.g., current location of the tool cursor) being passed to the tool's respective physical simulator 204 while the tool is being applied.

In at least some embodiments, computing technology, including but not limited to GPU (Graphic Processing Units) and multi-core CPUs, may be leveraged to enable the physical simulator 204 to process the 2D mesh representation 222 and render results in real-time or near-real-time. In at least some embodiments, portable parallelism libraries, such as OpenCL, and platform specific math libraries may be leveraged to provide the computational resources necessary for near-real-time or real-time performance.

After the selected tool's respective physical simulator 204 completes execution, the resulting object may be rendered and displayed in the working image on the display screen. The working image may then be stored, displayed, printed, and so on.

In some embodiments, the physical simulators 204 may execute in a background process to render the physical effects of applications of the tools 200 to selected objects. For example, a background process may be scheduled to execute 30 times a second, 60 times a second, or at some other periodic or aperiodic interval; elements 250 and 260 may occur at each execution of the background process. Alternatively, the physical simulators 204 may be implemented in a loop in an event-driven program. In this implementation, the event-driven program may check for events that indicate applications of the tools 200 to selected objects. When a tool-related event is detected, one or more iterations of elements 250 and 260 may be performed.

While the 2D physical simulation tools illustrated in FIG. 10 are generally described herein in relation to simulating physical effects in static 2D images, the 2D physical simulation tools and the gesture methods used with the tools may also be extended to 2D animation. In some embodiments, to generate an animation of a physical effect generated according to one of the tools and the corresponding physical simulator, results of each iteration (e.g., the updated working image) may be stored or saved at element 260.

FIGS. 11 and 12A-12C illustrate example user interfaces that may be used in at least some embodiments for applying 2D physical simulation tools to generate 2D artwork, as described herein. These user interfaces are given by way of example, and are not intended to be limiting.

FIG. 11 illustrates an example user interface to a 2D drawing application that implements an embodiment of the method for simulating various physical effects on 2D objects as described herein. Note that user interface 300 is provided as an example, and is not intended to be limiting. The user interface 300 may provide a drawing area 310 on which 2D drawing may be performed via one or more user interface elements and techniques. The user interface 300 may provide a menus 302 area that includes one or more menu user interface elements via which a user may select various menu items to perform various functions or select various tools of the application. For example, a menu in menus 302 area may include an open option via which a user can open a new drawing, a save option via which a user may save a current drawing, and a print option via which a user may print a current drawing. In FIG. 11, drawing area 310 shows a drawing that includes an object 342 (a shaded capital letter "G"). Drawing area 310 also shows a current tool cursor 340 (in this example, a match cursor representing the currently selected match tool) being applied to selected object 342 to generate a simulated physical effect 344 (in this example, smoke rising from the object 342).

The user interface 300 may also provide a tool palette 304 that includes one or more user interface elements via which a user may select among various 2D physical simulation tools for editing and enhancing selected 2D objects based on 2D physical simulations, as described herein. In this example, tool palette 304 includes a hammer tool for fracturing and shattering objects, a hook tool for stretching elastic objects, a match tool for generating smoke and/or flame effects on objects, a heat gun tool for melting objects, and a fan tool for applying wind effects to objects. However, various other 2D physical simulation tools may also be provided via tool palette 304. In FIG. 11, the match tool is indicated as being the currently selected tool in tool palette 304 by the bolded box around the match tool user interface element.

The user interface 300 may also provide a materials palette 306 that includes one or more user interface elements via which a user may specify various types of predefined materials or substances for selected objects in drawing area 310. In this example, materials palette 306 includes wood, stone, glass, ice, rubber, plastic, paper, and metal as example predefined materials. However, various other predefined materials may also be provided via materials palette 306. In FIG. 11, wood is indicated as being the currently selected material in materials palette 306 for the selected object 342 by the bolded box around the wood user interface element.

While FIG. 11 shows the user interface 300 as providing a tool palette 304 and materials palette 306 that each include icons or buttons that may be selected by a user, other user interface techniques may be used to select among tools and/or materials in addition to or instead of the palette technique. For example, in some embodiments, menu user interface elements may be provided from which tools and/or materials may be selected.

The user interface 300 may also include one or more other user interface elements or controls 308, which may include but are not limited to buttons, slider bars, check boxes, radio buttons, text entry boxes, and popup menus, via which a user may provide input to the method for simulating various physical effects on 2D objects as described herein, and/or perform other drawing-related tasks. As a few examples, the user interface 300 may provide a control or controls via which a user may specify that an animation of a physical simulation initiated by one of the 2D physical simulation tools is to be generated, a control or controls via which a current drawing may be saved, and a control via which a user may "undo" one or more physical simulations previously initiated by one of the 2D physical simulation tools. In addition, the user interface 300 may provide one or more controls via which a user may adjust the values of one or more global simulations parameters, such as gravity and viscosity, and may provide one or more controls via which a user may adjust the values of one or more tool-specific parameters, such as wind speed for a fan tool or heat for a match tool or heat gun tool.

As previously mentioned, the 2D physical simulation tools may be implemented in various artistic, graphical design, and image processing applications. Thus, in at least some implementations, user interface 300 may include user interface elements for performing other tasks provided by the application than the 2D physical simulation tasks associated with the 2D physical simulation tools. As an example, in these implementations, tool palette 304 may provide one or more user interface elements that allow the user to select other types of tools for performing other tasks of the application, for example tools for adding new objects to the current drawing, or tools for otherwise modifying existing objects in a drawing.

Figure 12A:
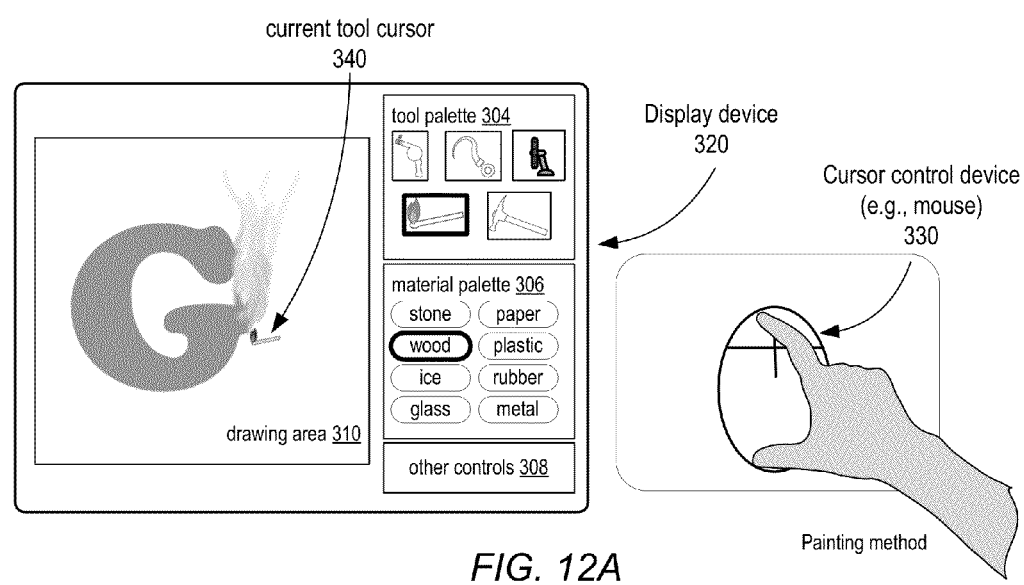
FIGS. 12A through 12C illustrate several example methods that may be used to interact with a user interface to apply physical simulations to selected objects using the 2D physical simulation tools as described herein.
Figure 12B:
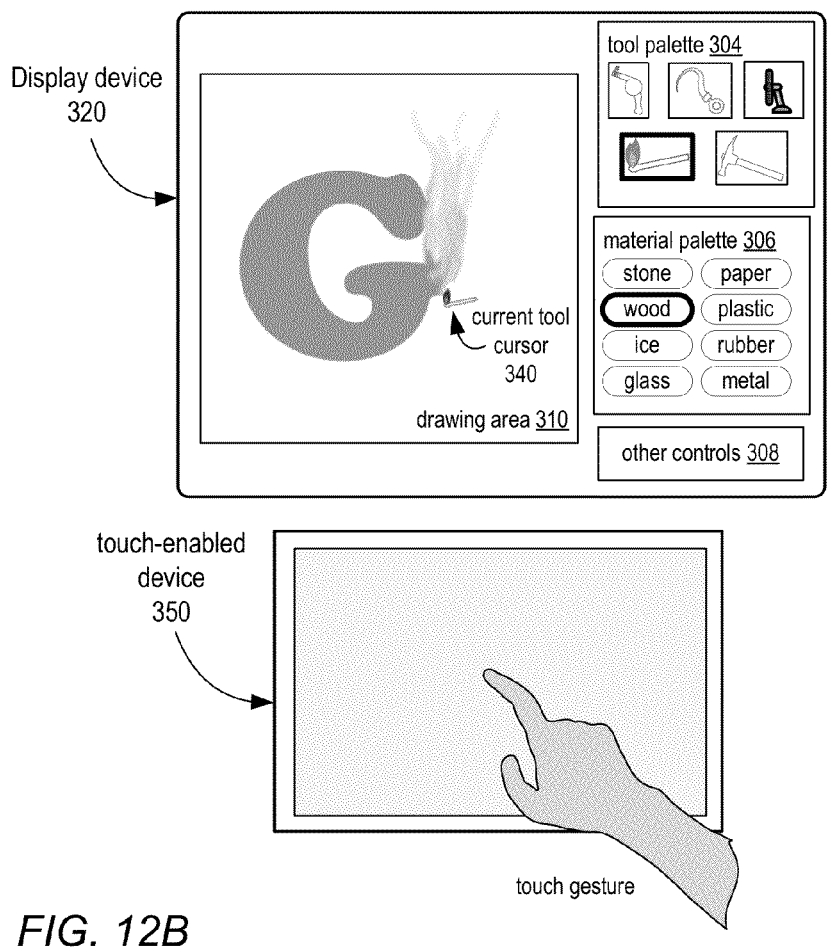
Figure 12C:
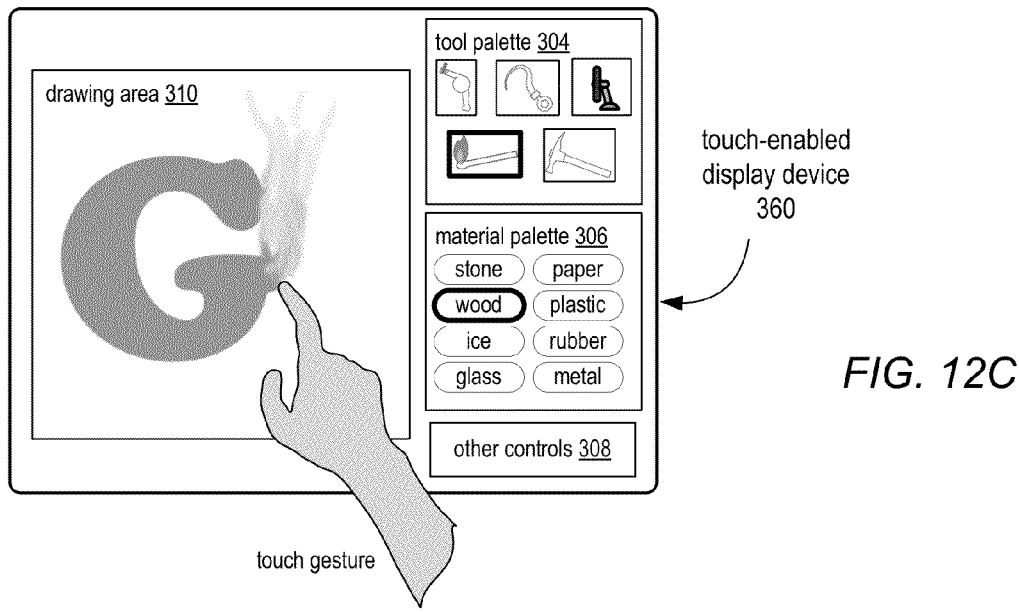

FIGS. 12A through 12C illustrate several example methods that may be used to interact with a user interface 300 to apply physical simulations to selected objects using the 2D physical simulation tools as described herein. FIG. 12A illustrates a method in which the user uses a cursor control device 330, for example a mouse, to control a current tool cursor 340 displayed on a display device 320. To apply a gesture to a selected object with the currently selected tool, the user may move the cursor control device 330 to cause a corresponding movement of the current tool cursor 340 on the user interface 300. Note that, in some gestures, the user may, for example, hold down a mouse button when applying a gesture, releasing the mouse button when the gesture is done. The user may use the cursor control device 330 to perform other functions on the user interface, for example to select from the tool palette 304, materials palette 306, and other controls 308.

In at least some embodiments, a touch method, where a user interacts with the user interface 300 via a touch-enabled device using gestures applied with one or more digits and/or a stylus, may be used. The touch-enabled device may be a conventional touch device in which a single digit or stylus is used, or a multi-touch device that accepts and processes substantially simultaneous input from two or more digits. FIG. 12B illustrates a method that employs a touch-enabled device 350, such as a touch-sensitive pad, to apply gestures to a selected object with the current tool cursor 340 in a drawing area 310 displayed on a display device 320. FIG. 12C illustrates a method that employs a touch-enabled display device 360 to apply gestures to a selected object with the current tool cursor 340 in a drawing area 310 displayed on the display device 360.

Some touch-enabled devices may be pressure-sensitive, and thus may support pressure functions. For example, a touch pad as illustrated in FIG. 12B may be pressure-sensitive. With such a device, at least some embodiments may support various functions enabled by pressure applied via a stylus to the touch surface. For example, varying levels of pressure applied by a stylus to the touch surface may be used to modulate one or more values input to a physical simulator.

Figure 13:
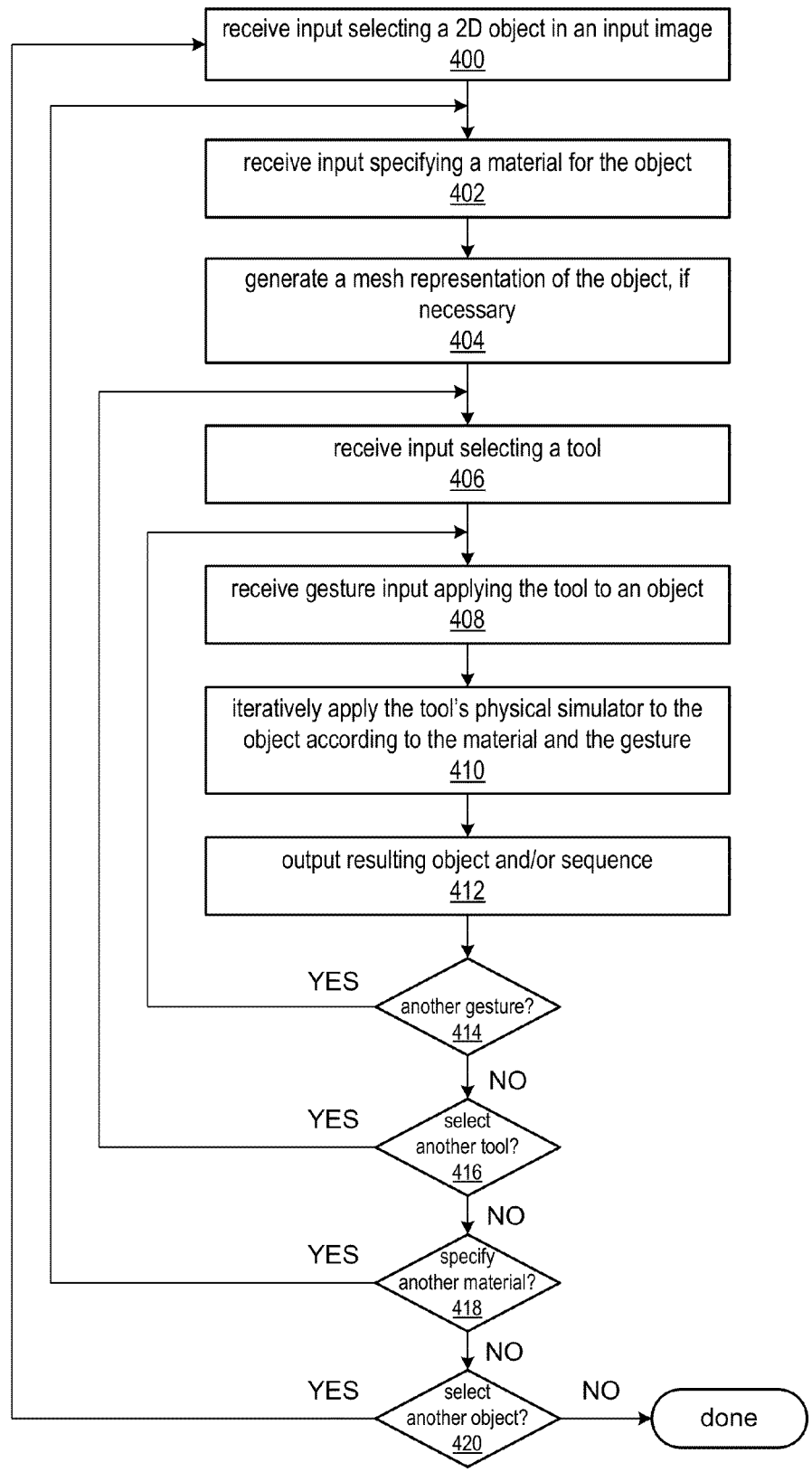
FIG. 13 is a flowchart of a method for applying 2D physical simulation tools to 2D objects to achieve various simulated physical effects associated with the tools, according to at least some embodiments.
Figure 14:
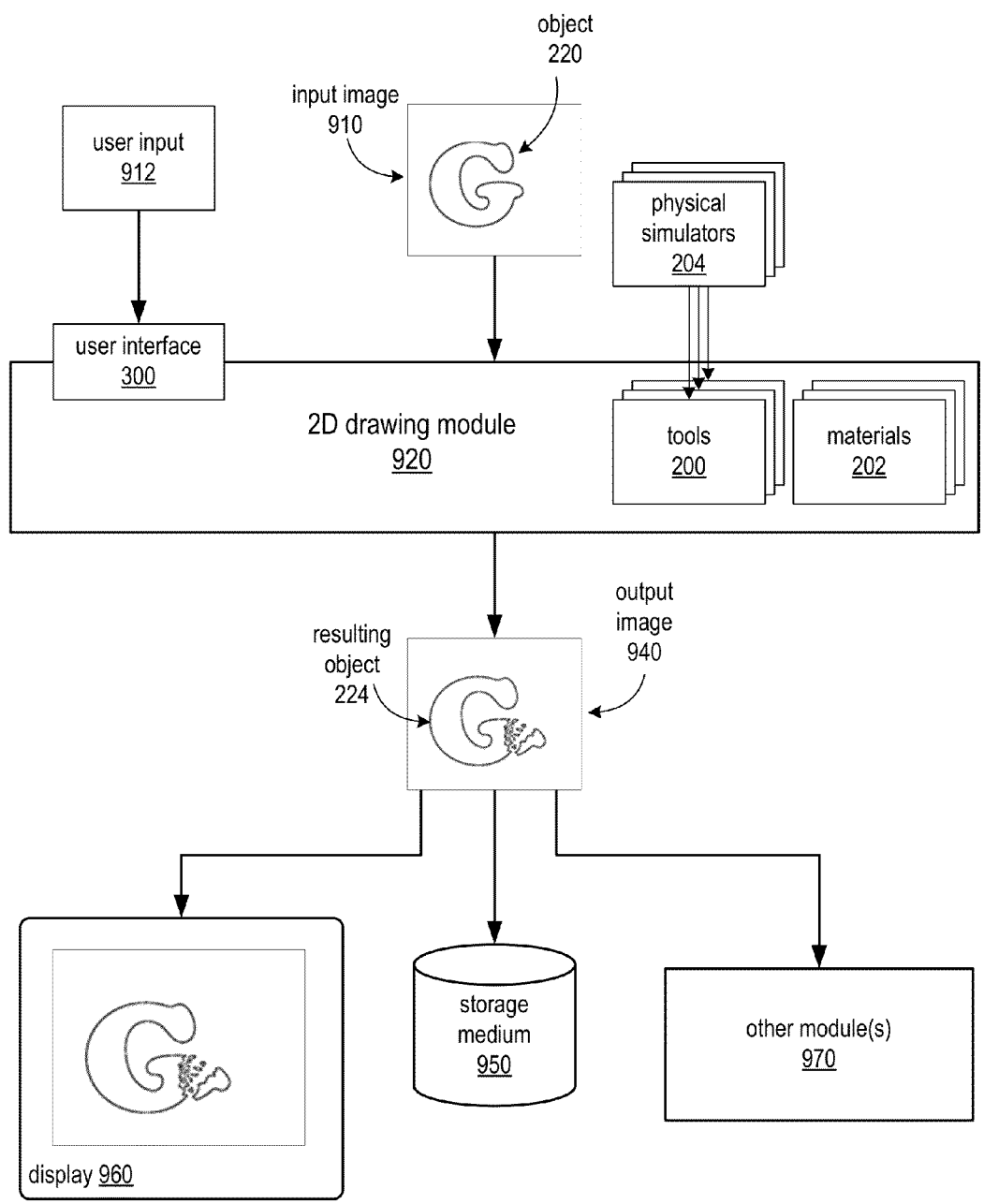
FIG. 14 illustrates a 2D drawing module that may implement embodiments of the methods for simulating various physical effects on 2D objects in a 2D drawing environment as illustrated in FIGS. 1 through 13.
Figure 15:
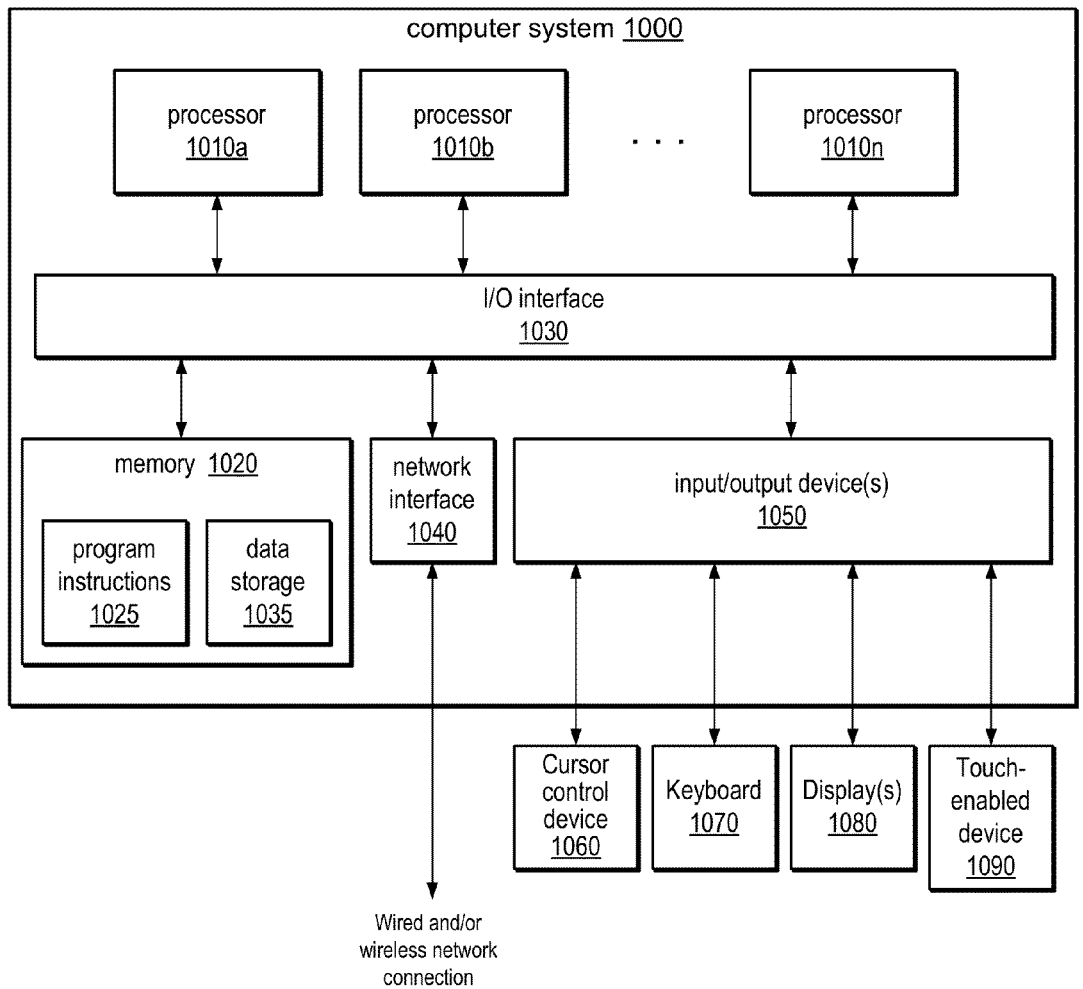
FIG. 15 illustrates an example computer system that may be used in embodiments.

FIG. 13 is a flowchart of a method for applying 2D physical simulation tools to 2D objects to achieve various simulated physical effects associated with the tools, according to at least some embodiments. An example 2D drawing module that may implement embodiments of the method is illustrated in FIG. 14. An example computer system on which embodiments of the method may be implemented is illustrated in FIG. 15. An example user interface to the method is illustrated in FIG. 11.

As indicated at 400, input selecting a 2D object in an input image may be received. The input image may, for example, be a digital image that includes one or more vector-based or raster-based objects that were previously created using one or more other 2D drawing techniques. As indicated at 402, input specifying a predefined material for the selected object may be received. The specified material may correspond to a material definition specifying values for a set of physical properties of the material. Examples of predefined materials may include, but are not limited to, wood, stone, glass, ceramic, ice, rubber, plastic, paper, cloth, wax, modeling clay, metals, alloys, composites, or variations thereof. As indicated at 404, a mesh representation of the selected object may be generated, if necessary (e.g., if a mesh representation does not already exist for the object). FIG. 2 illustrates an example mesh representation 44. In at least some embodiments, an adaptive tessellation technique may be employed to generate the mesh representation 44. In adaptive tessellation, the density of the mesh may be increased at certain parts of a selected object, for example parts of the selected object where a physical simulation initiated by a selected tool is concentrated, or parts of a selected object where the 2D shape of the object is more complex.

As indicated at 406, input selecting a 2D physical simulation tool may be received. For example, the input may specify a physical simulation tool selected from a tool palette or other user interface element provided by a user interface. FIG. 11 shows an example user interface that includes a tool palette 304 from which a 2D physical simulation tool, such as a hammer, a hook, a match, a heat gun, or a fan, may be selected. Each 2D physical simulation tool may be associated with at least one of a plurality of physical simulators. The physical simulators may, for example, be implemented as a library of physical simulation functions, or as physical simulation functions or modules implemented within a 2D drawing application that implements the method for simulating various physical effects on 2D objects as described herein. Thus, for the example tools described herein (a hammer tool, a hook tool, a match tool, a heat gun tool, and a fan tool), each of the tools is associated with a corresponding physical simulator (i.e., a fracturing simulator for the hammer tool, a stretching simulator for the hook tool, a fire/smoke simulator for the match tool, a melting simulator for the heat gun tool, and a wind effect simulator for the fan tool). Other 2D physical simulation tools may be provided, and each of those tools would be associated with a physical simulator that simulates the physical effect initiated by application of the respective tool.

While not shown, in at least some embodiments, input may be received specifying values for one or more global simulation parameters, such as gravity and viscosity, that may affect the operation of the physical simulator associated with the selected 2D physical simulation tool. In addition, in at least some embodiments, input may be received specifying values for one or more tool-specific parameters for the selected 2D physical simulation tool that may affect the physical simulation initiated by application of the selected 2D physical simulation tool to objects.

As indicated at 408, gesture input applying the selected 2D physical simulation tool to the selected object may be received. For example, via a user interface, the user may place the tool near a desired area of the selected object, or may apply a simple gesture such as a stroke, depending on the selected tool. In at least some embodiments, applying a tool to an object may involve moving a cursor representing the respective tool on or near a selected object via a cursor control device, and may also involve depressing, holding, and releasing one or more buttons on a cursor control device and/or on a keyboard. Example user interfaces for applying the 2D physical simulation tools are illustrated in FIG. 11 and FIGS. 12A-12C. Note that these user interfaces may be controlled using cursor control devices such as a mouse or alternatively via touch-enabled or multitouch-enabled devices.

As indicated at 410, in response to the gesture input, the physical simulator associated with the selected 2D physical simulation tool may be iteratively applied to the selected object according to the material of the selected object and the gesture input. In at least some embodiments, one or more global simulation parameters, such as gravity and viscosity, and/or one or more tool-specific parameters, such as the speed of a hammer tool or the heat of a match tool or a heat gun tool, may also affect the application of the physical simulator to the object. At each iteration, the results of the physical simulation may be, but are not necessarily, rendered and displayed in a working image on a display device. As indicated at 412, after the physical simulator completes the simulation, the resulting object, modified according to the physical simulation, may be output to the working image. Instead, or in addition, a sequence of frames representing the rendering of the object at each iteration of the physical simulator may be output as an animation.

In at least some embodiments, at 410, the mesh representation of the selected object may be passed to the physical simulator as a geometric representation of the object on which the physical simulation is to be performed. Other information may also be passed to the physical simulator, such as the type of material that the object is composed of or alternatively one or more parameters of the material, values for one or more global simulation parameters, and values for one or more tool-specific parameters. Information about the gesture used to apply the tool, such as a location on or near the object and a velocity and vector or direction of the gesture, may also be passed to the physical simulator. In general, any information about the object and gesture necessary to perform the physical simulation may be passed to, or otherwise obtained by, the physical simulator. The iterative execution of the physical simulator may, for example, end when the effect caused by application of the selected 2D physical simulation tool has completed, for example when all the pieces of an object shattered by a hammer have settled. Note that, for some tools such as the match tool, the heat gun tool, and the fan tool, the tool's respective physical simulator may execute at least as long as the tool is being applied to the object, with additional information (e.g., current location of the tool cursor) being passed to the tool's respective physical simulator while the tool is being applied.

In at least some embodiments, computing technology, including but not limited to GPU (Graphic Processing Units) and multi-core CPUs, may be leveraged to enable the physical simulator to process the 2D mesh representation and render results in real-time or near-real-time. In at least some embodiments, portable parallelism libraries, such as OpenCL, and platform specific math libraries may be leveraged to provide the computational resources necessary for near-real-time or real-time performance.

The method illustrated in FIG. 13 may be interactively performed to further apply various physical simulations to one or more objects in an image. At 414, if another gesture is performed by the user with the selected tool, the method may return to element 408 to process the gesture. At 416, if the user selects another 2D physical simulation tool, the method may return to element 406. At 418, if the user specifies another material for an object, the method may return to element 404. At 420, if the user selects another object, the method may return to element 400.

Note that the order of at least some of the elements of the method illustrated in FIG. 13 may vary. For example, a 2D physical simulation tool may be selected prior to selecting an object. As another example, generating a mesh representation of a selected object may occur after selecting a 2D physical simulation tool. Note that some 2D physical simulation tools, for example a match tool that initiates a smoke physical effect as illustrated in FIGS. 4A-4C, may not require a mesh representation of the object, and thus for these tools a mesh representation of a selected object to which the tool is to be applied may not be generated, and a mesh representation of the object may not be passed to the corresponding physical simulator.

Some embodiments may include a means for performing the method for applying 2D physical simulation tools to 2D objects to achieve various simulated physical effects associated with the tools as described herein, for example in FIG. 13. For example, a 2D drawing module may receive user input, for example input selecting an object, input selecting a material for the object, input selecting a 2D physical simulation tool to apply to the object, and input applying one or more gestures to the object using the selected tool. In response to user input applying a gesture to the object using a selected 2D physical simulation tool, the 2D drawing module may apply a respective physical simulator to the object to simulate a physical effect on the object. The 2D drawing module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving user input including user input applying one or more gestures to a selected object using a selected 2D physical simulation tool and, in response to the user input, applying a respective physical simulator to the object to simulate a physical effect on the object, as described herein. Other embodiments of the 2D drawing module may be at least partially implemented by hardware circuitry and/or firmware stored, for example, in a non-volatile memory.

Embodiments of the 2D drawing module and/or of the method for applying 2D physical simulation tools to 2D objects to achieve various simulated physical effects associated with the tools as described herein may be implemented in any artistic, graphical design, or image processing application, or more generally in any application in which 2D physical effects may be simulated for artistic or other similar purposes. Embodiments of the method may, for example, be implemented as a stand-alone application, as a module of an application, as a plug-in for applications including but not limited to artistic, graphical design, and image processing applications, and/or as a library function or functions that may be called by other applications such as artistic, graphical design, and image processing applications. Specific examples of applications or technologies in which embodiments may be implemented include, but are not limited to, Adobe® Photoshop® technology, Adobe® Flash® technology, Adobe® Illustrator® technology, and Adobe® After Effects® technology. "Adobe", "Photoshop", "Flash", "Illustrator", and "After Effects" are either registered trademarks or trademarks of Adobe Systems Incorporated in the United States and/or other countries.

FIG. 14 illustrates a 2D drawing module that may implement embodiments of the methods for simulating various physical effects on 2D objects in a 2D drawing environment as illustrated in FIGS. 1 through 13. Module 920 may provide a plurality of different user-selectable 2D physical simulation tools 200 for simulating various physical effects on a selected 2D object 220 in an input image 910. FIG. 11 shows an example user interface that includes a tool palette 304 from which a 2D physical simulation tool 200 may be selected from among a plurality of tools. Each 2D physical simulation tool 200 may be associated with at least one of a plurality of physical simulators 204. The physical simulators 204 may, for example, be implemented as a library of physical simulation functions, or as physical simulation functions or modules implemented within a 2D drawing application that implements the module 920, or alternatively may be implemented within module 920. Module 920 may also provide a plurality of different predefined materials 210 that may be specified for the object 220, for example via user input to a materials palette 306 as illustrated in FIG. 11. Each material 210 may be predefined by values for a set of properties, such as elasticity, strength, viscosity, hardness, ignition point, and so on.

2D drawing module 920 may provide a user interface 300 via which a user may interact with the module 920, for example to specify or select objects in an input image 910, to specify or select a material 202 for an object, to specify or select a 2D physical simulation tool 200, to specify or modify one or more global simulation parameters and/or tool-specific parameters, and to apply a selected 2D physical simulation tool 200 to a selected object 220 to simulate a respective physical effect on the object, as described herein. An example user interface that may be used in at least some embodiments is illustrated in FIG. 11, and example methods for receiving user input 912 via user interface 300 are illustrated in FIGS. 12A through 12C.

Module 920 may receive as input an input image 910. The input image 910 may, for example, be a digital image that includes one or more vector-based or raster-based objects (e.g., object 220) that were previously created using one or more other 2D drawing techniques. Note that input image 910 may be an image that was previously created or modified by module 920. Module 920 may receive user input 912 via user interface 300, for example input selecting an object 220 in an input image 910, input selecting a material 202 for the object 220, input selecting a tool 200 to apply to the object 220, and input applying one or more gestures to the object 220 using the selected tool 200. In response to user input selecting an object 220, module 920 may generate a mesh representation of the object 204 as a geometric representation of the object on which a physical simulation is to be performed. In response to user input applying a gesture to the object 220 using a selected tool 200, module 920 may apply a respective physical simulator 204 to the object 220 to simulate a physical effect on the object 220. Note that the module may receive additional input 912 selecting other tools 200, selecting other materials 202, selecting other objects 220, and applying the selected tool(s) 200 to the selected object(s) 220. Module 920 may generate as output an output image 940 that includes the object 244 (or objects) modified according to the application of the selected tool(s) 200. Output image 940 may, for example, be stored to a storage medium 950, such as system memory, a disk drive, DVD, CD, etc., displayed to a display device 960, printed on a printer device (not shown), and/or passed to one or more other module(s) 970 for additional processing.

While module 920 of FIG. 14 is described above in relation to simulating physical effects in a static 2D image, in some embodiments, the module 920 may also be applied to generating 2D animations of simulated physical effects. In some embodiments, to generate an animation of a physical effect generated by application of one of the tools 200, results of each iteration of the corresponding physical simulator (e.g., an updated working image) may be stored or saved.

While module 920 of FIG. 14 shows multiple user-selectable 2D physical simulation tools 200, and tool palette 304 of FIG. 11 shows multiple user interface elements for selecting among several example 2D physical simulation tools 200, implementations are possible in which only one 2D physical simulation tool 200 is provided via a user interface.

Example System

Embodiments of a 2D drawing module 920 as illustrated in FIG. 14 and/or of the methods for applying 2D physical simulation tools to 2D objects to achieve various simulated physical effects associated with the tools as described herein may be executed on one or more computer systems, which may interact with various other devices. One such computer system is illustrated by FIG. 15. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010a, 1010b, ... 1010n coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, display(s) 1080, and touch-enabled device 1090. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor or multi-core system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods for applying 2D physical simulation tools to 2D objects to achieve various simulated physical effects associated with the tools may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a 2D drawing module that implements methods for applying 2D physical simulation tools to 2D objects to achieve various simulated physical effects associated with the tools as described herein, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 15, memory 1020 may include program instructions 1025, configured to implement embodiments of a 2D drawing module that implements methods for applying 2D physical simulation tools to 2D objects to achieve various simulated physical effects associated with the tools as described herein as described herein, and data storage 1035, comprising various data accessible by program instructions 1025. In one embodiment, program instructions 1025 may include software elements of embodiments of a 2D drawing module that implements methods for applying 2D physical simulation tools to 2D objects to achieve various simulated physical effects associated with the tools as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a 2D drawing module that implements methods for applying 2D physical simulation tools to 2D objects to achieve various simulated physical effects associated with the tools as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method for simulating physical effects in two-dimensional (2D) drawings, comprising:
receiving, by a computing device, a previously created digital image;
displaying, in a user interface of the computing device, the previously created digital image;
receiving input, via the user interface, selecting a two-dimensional (2D) simulation tool to be applied to a 2D object in the displayed previously created digital image, the 2D simulation tool being selected from multiple 2D simulation tools presented in a tool palette in the user interface;
receiving gesture input indicating a gesture that controls the selected 2D simulation tool to apply the selected 2D simulation tool to at least one point on the 2D object as indicated by the gesture input;
in response to the gesture input, applying a 2D simulator corresponding to the selected 2D simulation tool to the 2D object, wherein the 2D simulator iteratively executes to apply a physics-based simulation to the 2D object as indicated by the gesture to generate a simulated physical effect;
rendering results of said applying the 2D simulator to the 2D object in the displayed digital image; and
generating an output image including the rendered results of said applying the 2D simulator to the 2D object.

2. The method as recited in claim 1, further comprising receiving input selecting a predefined physical material for the 2D object from a plurality of predefined physical materials presented as a materials palette in the user interface, wherein the predefined physical material is defined by a plurality of physical properties, and wherein the physical properties of the predefined physical material affect the physics-based simulation applied to the 2D object by the 2D simulator.

3. The method as recited in claim 1, further comprising receiving input specifying values for one or more global simulation parameters, wherein the global simulation parameters affect the physics-based simulation applied to the 2D object by the 2D simulator.

4. The method as recited in claim 1, further comprising receiving input specifying values for one or more tool-specific parameters for the selected 2D simulation tool, wherein the tool-specific parameters affect the physics-based simulation applied to the 2D object by the 2D simulator corresponding to the selected 2D simulation tool.

5. The method as recited in claim 1, wherein the displayed image includes one or more 2D objects, the method further comprising receiving selection input specifying a particular one of the one or more 2D objects as the 2D object to which the selected 2D simulation tool is to be applied.

6. The method as recited in claim 1, further comprising obtaining or generating a mesh representation of the 2D object, wherein, in said applying a 2D simulator corresponding to the selected 2D simulation tool to the 2D object, the physics-based simulation is applied to the mesh representation of the 2D object.

7. The method as recited in claim 6, further comprising generating the mesh representation according to an adaptive tessellation technique.

8. The method as recited in claim 1, wherein each of the multiple 2D simulation tools corresponds to one of multiple 2D simulators for generating different simulated physical effects.

9. The method as recited in claim 1, wherein
the simulated physical effect of a first 2D simulation tool presented in the tool palette is a fracturing and shattering effect that simulates fracturing and shattering of the 2D object,
the simulated physical effect of a second 2D simulation tool presented in the tool palette is a smoke effect that simulates smoke rising from the 2D object,
the simulated physical effect of a third 2D simulation tool presented in the tool palette is a melting effect that simulates melting of the 2D object,
the simulated physical effect of a fourth 2D simulation tool presented in the tool palette is a stretching effect that simulates stretching of the 2D object, and
the simulated physical effect of a fifth 2D simulation tool presented in the tool palette is a wind effect that simulates results of wind pressure on the 2D object.

10. The method as recited in claim 1, further comprising outputting results of at least two iterations of the 2D simulator as an animation of the simulated physical effect.

11. The method as recited in claim 1, wherein the 2D object is a vector-based graphical object.

12. The method as recited in claim 1, wherein the 2D object is a raster-based graphical object.

13. A system, comprising:
at least one processor;
a display device; and
a memory comprising program instructions, wherein the program instructions are executable by the at least one processor to implement a two-dimensional (2D) drawing module operable to:
receive a previously created digital image;
display the previously created digital image in a user interface;
receive input, via the user interface, selecting a two-dimensional (2D) simulation tool to be applied to a 2D object in the previously created digital image, the 2D simulation tool being selected from multiple 2D simulation tools presented in a tool palette in the user interface displayed on the display device;
receive gesture input indicating a gesture that controls the selected 2D simulation tool to apply the selected 2D simulation tool to at least one point on the 2D object as indicated by the gesture input;
in response to the gesture input, iteratively apply a physics-based simulation to the 2D object as indicated by the gesture to generate a simulated physical effect;
render results of said iteratively applying the physics-based simulation to the 2D object in the displayed digital image; and
generate an output image including the rendered results of said iteratively applying the 2D simulator to the 2D object.

14. The system as recited in claim 13, wherein the 2D drawing module is further operable to receive input selecting a predefined physical material for the 2D object from a plurality of predefined physical materials presented as a materials palette in the user interface, wherein the predefined physical material is defined by a plurality of physical properties, and wherein the physical properties of the predefined physical material affect the physics-based simulation applied to the 2D object.

15. The system as recited in claim 13, wherein each of the multiple 2D simulation tools corresponds to one of multiple 2D simulators that implement different physics-based simulations for generating different simulated physical effects.

16. The system as recited in claim 13, wherein
the simulated physical effect of a first 2D simulation tool presented in the tool palette is a fracturing and shattering effect that simulates fracturing and shattering of the 2D object,
the simulated physical effect of a second 2D simulation tool presented in the tool palette is a smoke effect that simulates smoke rising from the 2D object,
the simulated physical effect of a third 2D simulation tool presented in the tool palette is a melting effect that simulates melting of the 2D object,
the simulated physical effect of a fourth 2D simulation tool presented in the tool palette is a stretching effect that simulates stretching of the 2D object, and
the simulated physical effect of a fifth 2D simulation tool presented in the tool palette is a wind effect that simulates results of wind pressure on the 2D object.

17. The system as recited in claim 13, wherein the 2D drawing module is further operable to generate as output results of at least two iterations of the 2D simulator as an animation of the simulated physical effect.

18. The system as recited in claim 13, wherein the 2D object is one of a vector-based graphical object and a raster-based graphical object.

19. A non-transitory computer-readable storage medium storing program instructions, wherein the program instructions are computer-executable to implement a two-dimensional (2D) drawing module operable to:
receive a previously created digital image;
display the previously created digital image in a user interface;
receive input, via the user interface, selecting a two-dimensional (2D) simulation tool to be applied to a 2D object in the displayed previously created digital image, the 2D simulation tool being selected from multiple 2D simulation tools presented in a tool palette in the user interface;
receive gesture input indicating a gesture that controls the selected 2D simulation tool to apply the selected 2D simulation tool to at least one point on the 2D object as indicated by the gesture input;
in response to the gesture input, iteratively apply a physics-based simulation to the 2D object as indicated by the gesture to generate a simulated physical effect;
render results of said iteratively applying the physics-based simulation to the 2D object in the displayed digital image; and generate an output image including the rendered results of said iteratively applying the 2D simulator to the 2D object.

20. The non-transitory computer-readable storage medium as recited in claim 19, wherein the 2D drawing module is further operable to receive input selecting a predefined physical material for the 2D object from a plurality of predefined physical materials presented as a materials palette in the user interface, wherein the predefined physical material is defined by a plurality of physical properties, and wherein the physical properties of the predefined physical material affect the physics-based simulation applied to the 2D object.

21. The non-transitory computer-readable storage medium as recited in claim 19, wherein each of the multiple 2D simulation tools corresponds to one of multiple 2D simulators that implement different physics-based simulations for generating different simulated physical effects.

22. The non-transitory computer-readable storage medium as recited in claim 19, wherein the simulated physical effect of a first 2D simulation tool presented in the tool palette is a fracturing and shattering effect that simulates fracturing and shattering of the 2D object, the simulated physical effect of a second 2D simulation tool presented in the tool palette is a smoke effect that simulates smoke rising from the 2D object, the simulated physical effect of a third 2D simulation tool presented in the tool palette is a melting effect that simulates melting of the 2D object, and the simulated physical effect of a fourth 2D simulation tool presented in the tool palette is of a wind effect that simulates results of wind pressure on the 2D object.

23. The non-transitory computer-readable storage medium as recited in claim 19, wherein the 2D drawing module is further operable to generate as output results of at least two iterations of the 2D simulator as an animation of the simulated physical effect.

* * * * *